(12) United States Patent
Yamamoto

(10) Patent No.: US 12,018,921 B2
(45) Date of Patent: Jun. 25, 2024

(54) GAS GENERATOR

(71) Applicant: Daicel Corporation, Osaka (JP)

(72) Inventor: Koji Yamamoto, Tokyo (JP)

(73) Assignee: Daicel Corporation, Osaka (JP)

( * ) Notice: Subject to any disclaimer, the term of this patent is extended or adjusted under 35 U.S.C. 154(b) by 206 days.

(21) Appl. No.: 17/634,230

(22) PCT Filed: Aug. 3, 2020

(86) PCT No.: PCT/JP2020/029701
§ 371 (c)(1),
(2) Date: Feb. 9, 2022

(87) PCT Pub. No.: WO2021/029257
PCT Pub. Date: Feb. 18, 2021

(65) Prior Publication Data
US 2022/0276030 A1    Sep. 1, 2022

(30) Foreign Application Priority Data

Aug. 9, 2019  (JP) .................................. 2019-148041

(51) Int. Cl.
*B60R 21/26*   (2011.01)
*B60R 21/264*  (2006.01)
*F42B 3/04*    (2006.01)

(52) U.S. Cl.
CPC .............. *F42B 3/04* (2013.01); *B60R 21/264* (2013.01); *B60R 2021/26029* (2013.01)

(58) Field of Classification Search
CPC ........ B60R 2021/26029; B60R 21/264; B60R 21/26; F42B 3/04
See application file for complete search history.

(56) References Cited

U.S. PATENT DOCUMENTS 6,491,321 B1 * 12/2002 Nakashima ........ B01D 46/2403
280/736
6,669,230 B1 * 12/2003 Nakashima ......... B60R 21/2644
280/741

(Continued)

FOREIGN PATENT DOCUMENTS

JP    2013-226889 A   11/2013
JP    2014-073743 A    4/2014

(Continued)

OTHER PUBLICATIONS

International Search Report issued in corresponding International Patent Application No. PCT/JP2020/029701 dated Sep. 24, 2020.

(Continued)

*Primary Examiner* — Amy R Weisberg
*Assistant Examiner* — Maxwell L Meshaka
(74) *Attorney, Agent, or Firm* — Morgan, Lewis & Bockius LLP

(57) ABSTRACT

A gas generator in which, between an ignition device and an inner cylindrical member, on a side of the lid wall portion, a transfer charge chamber is formed, and on a side of another end portion of a peripheral wall portion, a flow space is formed, the flow space being a space configured to allow combustion gas to flow in from the transfer charge chamber when an igniter is actuated, and being a space configured to allow the combustion gas to flow out to the outside of the inner cylindrical member when the igniter is actuated, and a total cross-sectional area of an inflow path serving a flow path through which the combustion gas flows from the transfer charge chamber into the flow space is configured to be smaller than a cross-sectional area of the flow space.

20 Claims, 16 Drawing Sheets

(56) References Cited

U.S. PATENT DOCUMENTS

| | | | | |
|---|---|---|---|---|
| 6,722,694 B1* | 4/2004 | Nakashima | ......... | B60R 21/2644 280/736 |
| 7,125,041 B2* | 10/2006 | Kato | ................. | B60R 22/4628 280/736 |
| 8,424,909 B2* | 4/2013 | Kobayashi | ............... | F42B 3/04 280/736 |
| 8,590,929 B2* | 11/2013 | Nakayasu | ........... | B60R 21/2644 280/736 |
| 8,777,258 B2* | 7/2014 | Kobayashi | .......... | B60R 21/2644 280/736 |
| 9,353,703 B2* | 5/2016 | Kobayashi | ................ | F02G 3/00 |
| 9,487,183 B2* | 11/2016 | Bierwirth | ............ | B60R 21/2644 |
| 9,731,679 B2* | 8/2017 | Okuyama | .......... | B60R 21/2644 |
| 10,106,118 B2* | 10/2018 | Bierwirth | .............. | B60R 21/264 |
| 10,166,501 B2* | 1/2019 | Imoto | .................... | B60R 21/26 |
| 10,239,483 B2* | 3/2019 | Okuyama | ................ | F42B 3/04 |
| 11,577,683 B2* | 2/2023 | Yamamoto | .......... | B60R 21/2644 |
| 2004/0245753 A1* | 12/2004 | Kato | ........................ | F42B 3/04 280/736 |
| 2004/0251667 A1* | 12/2004 | Harada | ................... | F42B 3/107 280/736 |
| 2006/0267322 A1* | 11/2006 | Eckelberg | ............... | B60R 21/26 280/736 |
| 2011/0193330 A1* | 8/2011 | Kobayashi | .......... | B60R 21/2644 280/741 |
| 2011/0221176 A1* | 9/2011 | Bierwirth | ............ | B60R 21/2644 280/741 |
| 2011/0241324 A1* | 10/2011 | Nakayasu | ........... | B60R 21/2644 280/736 |
| 2011/0253000 A1* | 10/2011 | Kobayashi | .......... | B60R 21/2644 102/531 |
| 2012/0247361 A1* | 10/2012 | Kobayashi | .......... | B60R 21/2644 102/530 |
| 2013/0283760 A1* | 10/2013 | Kobayashi | .......... | B60R 21/2644 60/39.12 |
| 2014/0096697 A1 | 4/2014 | Okuyama | | |
| 2016/0200285 A1 | 7/2016 | Okuyama | | |
| 2017/0001593 A1* | 1/2017 | Bierwirth | ............. | B60R 21/264 |
| 2017/0305384 A1 | 10/2017 | Okuyama | | |
| 2018/0264389 A1* | 9/2018 | Imoto | ................. | B60R 21/2644 |
| 2022/0276030 A1* | 9/2022 | Yamamoto | ................ | F42B 3/04 |

FOREIGN PATENT DOCUMENTS

| | | | | |
|---|---|---|---|---|
| WO | WO-2010082680 A1 | * | 7/2010 | ......... B60R 21/2644 |
| WO | WO-2020050104 A1 | * | 3/2020 | |
| WO | WO-2022054376 A1 | * | 3/2022 | |

OTHER PUBLICATIONS

International Preliminary Report on Patentability and Written Opinion issued in corresponding International Patent Application No. PCT/JP2020/029701 dated Feb. 17, 2022.

* cited by examiner

GAS GENERATOR

TECHNICAL FIELD

The present invention relates to a gas generator configured to burn a gas generating agent by actuation of an igniter, thereby generating combustion gas.

BACKGROUND ART

For gas generators burning a gas generating agent filled inside a combustion chamber by actuating an igniter and generating combustion gas of the gas generating agent, it is important to burn the filled gas generating agent as desired and match characteristics represented by parameters such as discharge amount and discharge time of the combustion gas (hereinafter, referred to as "discharge characteristics") to desired characteristics. As such a gas generator, a gas generator is known in which an ignition device including an igniter and an igniter support that supports the igniter is accommodated inside an inner cylindrical member, a transfer charge that is burned by actuating the igniter is filled between the inner cylindrical member and the ignition device, and a gas generating agent is disposed outside the inner cylindrical member (for example, Patent Document 1). The gas generator is configured to provide a communication hole that communicates the inside and outside of the transfer charge chamber in the inner cylindrical member, and burn the gas generating agents by ejecting the combustion gas of the transfer charge from the communication hole.

CITATION LIST

Patent Document

Patent Document 1: JP 2014-73743 A

SUMMARY OF INVENTION

Technical Problem

For the gas generator as described above, in general, in order to burn the gas generating agent evenly and generate the combustion gas as designed, the gas generating agent is evenly disposed around the periphery of the inner cylindrical member. However, when a combustion internal pressure of the transfer charge is high, the flow rate of the combustion gas of the transfer charge becomes high, and the gas generating agent may be cracked by the impact of the combustion gas ejected from the communication hole. This leads to an increase in a surface area of the gas generating agent, which may result in instability of discharge characteristics.

The technique of the present disclosure has been made in light of the problems described above, and an object of the present disclosure is to provide a technique capable of stably obtaining desired discharge characteristics in a gas generator burning a gas generating agent by ejecting the combustion gas of a transfer charge filled in an inner cylindrical member to the outside of the inner cylindrical member.

Solution to Problem

In order to solve the above problems, a gas generator of the present disclosure adopts the following configurations. In other words, the gas generator of the present disclosure includes: a housing; an ignition device including an igniter and an igniter support formed in the housing and supporting the igniter; an inner cylindrical member having a cylindrical peripheral wall portion and a lid wall portion configured to close one end portion of the peripheral wall portion, and accommodating the ignition device inside, and configured to form a transfer charge chamber which is filled with a transfer charge that is configured to be burned by actuation of the igniter between the inner cylindrical member and the ignition device; and a gas generating agent disposed outside the inner cylindrical member and configured to be burned by combustion gas of the transfer charge, in which, between the ignition device and the inner cylindrical member, on a side of the lid wall portion, the transfer charge chamber is formed, and on a side of another end portion of the peripheral wall portion, a flow space is formed, the flow space being a space configured to allow the combustion gas to flow in from the transfer charge chamber when the igniter is actuated, and being a space configured to allow the combustion gas to flow out to the outside of the inner cylindrical member when the igniter is actuated, and a total cross-sectional area of an inflow path serving as a flow path through which the combustion gas flows from the transfer charge chamber into the flow space is configured to be smaller than a cross-sectional area of the flow space.

According to such a gas generator, at least part of the combustion gas of the transfer charge generated in the transfer charge chamber does not flow directly from the transfer charge chamber to the outside of the inner cylindrical member, but temporarily stays in the flow space and then flows out. At this time, since the total cross-sectional area of the inflow path is configured to be smaller than the cross-sectional area of the flow space, the flow rate of the combustion gas in the flow space is lower than the flow rate in the inflow path. As a result, the combustion gas in the flow space can be decelerated. That is, according to the gas generator, the combustion gas of the transfer charge that flows out from the flow space is decelerated. Therefore, it is possible to suppress that the gas generating agent is damaged due to the impact of the combustion gas. As a result, it becomes possible to stably obtain the desired discharge characteristics.

Further, in the gas generator described above, a total cross-sectional area of an outflow path serving as a flow path through which the combustion gas flows out from the flow space to the outside of the inner cylindrical member, may be configured to be equal to or smaller than the cross-sectional area of the flow space. With this configuration, the combustion gas can stay easily in the flow space, and the flow rate of the combustion gas in the flow space can be suitably reduced.

Further, in the gas generator described above, the total cross-sectional area of the outflow path may be configured to be larger than the total cross-sectional area of the inflow path. With this configuration, the flow rate of the combustion gas flowing out from the outflow path can be further reduced.

Note that the "cross-sectional areas" of the inflow path, the flow space, and the outflow path referred to here are areas of these flow paths, and the "cross-sectional area" refers to an area in a cross section substantially orthogonal to the direction of flow when the combustion gas of the transfer charge flows. The "total cross-sectional area" of the inflow path refers to a total area of the cross-sectional areas of all the inflow paths formed in the gas generator. When a plurality of inflow paths are formed, the sum of the cross-sectional areas of the respective inflow paths is the total cross-sectional area, and when only one inflow path is formed, the cross-sectional area of this inflow path is the total cross-sectional area. Similarly, the "total cross-sectional area" of the outflow path refers to a total area of the cross-sectional areas of all the outflow paths formed in the gas generator. Further, the inflow path and outflow path described above may be formed before the igniter is actuated, or may be formed by actuating the igniter.

In the gas generator described above, the ignition device may have a flange portion, the flange portion protruding toward the peripheral wall portion and being configured to separate the transfer charge chamber from the flow space, and the flange portion and the peripheral wall portion are fitted with a gap at least partially, and the inflow path may be formed by the gap. With this configuration, when assembling the gas generator, there is an advantage that the inner cylindrical member can be easily press-fitted into the flange portion.

Further, in the gas generator described above, on an outer peripheral surface of the flange portion, a flange-side contact portion and a flange-side gap forming portion are formed, the flange-side contact portion being in contact with the peripheral wall portion, and the flange-side gap forming portion being located radially inside the flange-side contact portion and forming the gap between the flange-side gap forming portion and the peripheral wall portion. With this configuration, the inflow path described above can be formed.

Further, in the gas generator described above, on an inner peripheral surface of the peripheral wall portion, at a fitting portion with the flange portion, an inner cylinder-side contact portion and an inner cylinder-side gap forming portion are formed, the inner cylinder-side contact portion being in contact with the flange portion, and the inner cylinder-side gap forming portion being located radially outside the inner cylinder-side contact portion and forming the gap between the inner cylinder-side gap forming portion and the flange portion. With this configuration as well, the inflow path described above can be formed.

Further, in the gas generator having the flange portion described above, a weakened part may be formed in the flange portion, the weakened part being configured to receive pressure of the combustion gas and to be deformed, allowing the inflow path to open, and the inflow path may be formed as a through hole passing through the flange portion.

Further, in the gas generator described above, the inner cylindrical member may be disposed in a state that another end portion of the peripheral wall portion abuts on the housing, and the outflow path may be formed between the other end portion of the peripheral wall portion and the housing when the inner cylindrical member receives pressure of the combustion gas, and the other end portion of the peripheral wall portion moves away from the housing. With this configuration, the outflow path is formed in a substantially annular shape, and the combustion gas can be evenly discharged radially from the outflow path. Therefore, the gas generating agent disposed around the inner cylindrical member can be efficiently burned.

Further, in the gas generator described above, the inner cylindrical member may be disposed in a state that another end portion of the peripheral wall portion abuts on the housing, and at the other end portion of the peripheral wall portion, a contact end portion abutting on the housing and a recessed end portion recessed in an axial direction from the contact end portion may be formed, and the outflow path may be formed between the recessed end portion and the housing.

Note that the technique of the present disclosure can be applied to both a single stage gas generator provided with only one ignition device and a dual stage gas generator provided with two ignition devices.

Advantageous Effects of Invention

According to the technique of the present disclosure, in the gas generator that burns the gas generating agent by ejecting the combustion gas of the transfer charge filled in the inner cylindrical member to the outside of the inner cylindrical member, it is possible to stably obtain the desired discharge characteristics.

DESCRIPTION OF EMBODIMENTS

A gas generator according to an embodiment of the present disclosure will be described below with reference to the drawings. Note that each of the configurations, combinations thereof, and the like in each embodiment is an example, and various additions to the configuration, omissions, substitutions, and other changes may be made as appropriate without departing from the spirit of the present invention. The present invention is not limited by the embodiments and is limited only by the claims.

First Embodiment

[Overall Configuration]

Figure 1:
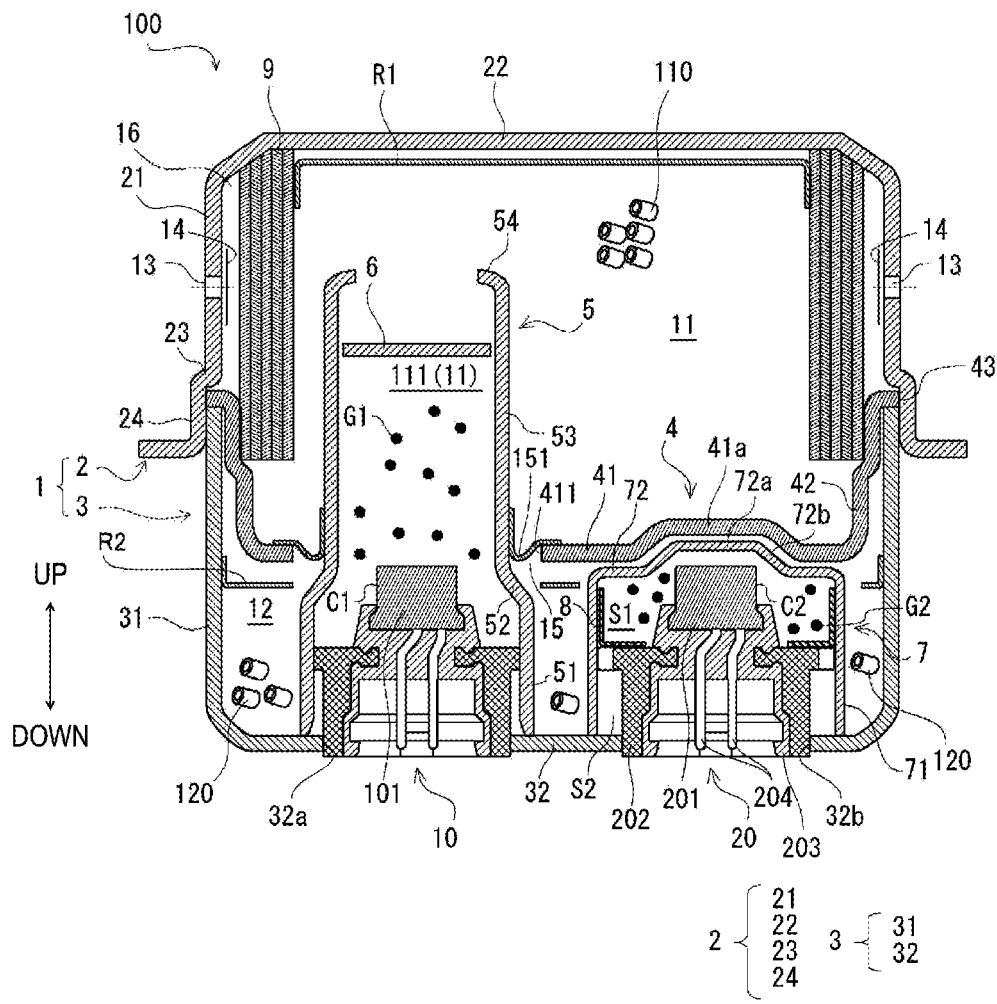
FIG. 1 is an axial cross-sectional view of a gas generator according to a first embodiment.

FIG. 1 is an axial cross-sectional view of a gas generator 100 according to a first embodiment. The gas generator 100 is configured as a so-called dual stage gas generator including two ignition devices. Specifically, as illustrated in FIG. 1, the gas generator 100 includes a first ignition device 10, a second ignition device 20, a partition wall member 4, a first inner cylindrical member 5, a partition member 6, a second inner cylindrical member 7, a seal cup 8, a filter 9, and a housing 1 that accommodates them. An internal space of the housing 1 is divided by the partition wall member 4 into a first combustion chamber 11 in which the first ignition device 10 and a first gas generating agent 110 are accommodated and a second combustion chamber 12 in which the second ignition device 20 and a second gas generating agent 120 are accommodated.

The gas generator 100 is configured to actuate a first igniter 101 included in the first ignition device 10 and a second igniter 201 included in the second ignition device 20, finally burn the gas generating agents filled in the respective combustion chambers, and discharge the combustion gas, which is the combustion product, from gas discharge ports 13 formed in the housing 1. As illustrated in FIG. 1, the second ignition device 20 is accommodated in the second inner cylindrical member 7, and a transfer charge chamber S1 and a flow space S2 are formed between the second ignition device 20 and the second inner cylindrical member 7. The transfer charge chamber S1 is filled with a second transfer charge G2 that is burned by actuating the second igniter 201, and the flow space S2 is configured to receive the combustion gas of the second transfer charge G2 generated inside the transfer charge chamber S1 and discharge the combustion gas to the outside of the second inner cylindrical member 7. The combustion gas of the second transfer charge G2 burns the second gas generating agent 120. As will be described in detail later, the gas generator 100 slows down the flow rate of the combustion gas of the second transfer charge G2 by using the flow space S2, and makes it possible to suppress damage and the like to the second gas generating agent 120. Each configuration of the gas generator 100 will be described below.

[Housing]

The housing 1 is formed in a short cylindrical shape with both ends in an axial direction closed by joining an upper shell 2 and a lower shell 3 each formed of metal, and each formed to be a bottomed substantially cylindrical shape in a state where the respective opening ends face each other. Here, a direction along the axial direction of the housing 1 is defined as a vertical direction of the gas generator 100, where the upper shell 2 side (i.e., the upper side in FIG. 1) is defined as an upper side of the gas generator 100, and the lower shell 3 side (i.e., the lower side in FIG. 1) is defined as a lower side of the gas generator 100.

The upper shell 2 has an upper peripheral wall portion 21 in a cylindrical shape and a top plate portion 22 that closes the upper end of the upper peripheral wall portion 21, thereby forming an internal space. The internal space of the upper shell 2 is filled with the first gas generating agent 110. The top plate portion 22 has a generally circular shape when viewed from above. The upper peripheral wall portion 21 extends generally perpendicularly from the circumferential edge of the top plate portion 22 to form a peripheral wall having a cylindrical shape. The top plate portion 22 is connected to the upper end side of the upper peripheral wall portion 21, and a fitting wall portion 24 is connected to the lower end side of the upper peripheral wall portion 21 by way of an abutment portion 23. An opening portion of the upper shell 2 is formed by a lower end portion of the fitting wall portion 24. In addition, the inner diameter of the fitting wall portion 24 is set to be larger than the inner diameter of the upper peripheral wall portion 21.

The lower shell 3 has a lower peripheral wall portion 31 having a cylindrical shape and a bottom plate portion 32 that closes the lower end of the lower peripheral wall portion 31, thereby forming an internal space. The internal space of the lower shell 3 is filled with the second gas generating agent 120. Similar to the top plate portion 22 of the upper shell 2, the bottom plate portion 32 has a generally circular shape when viewed from above. Further, the bottom plate portion 32 is provided with a first fitting hole 32a in which the first ignition device 10 is fixed, and a second fitting hole 32b in which the second ignition device 20 is fixed. The lower peripheral wall portion 31 extends generally perpendicularly from the circumferential edge of the bottom plate portion 32 to form a peripheral wall having a cylindrical shape. The bottom plate portion 32 is connected to the lower end side of the lower peripheral wall portion 31, and an opening portion of the lower shell 3 is formed by the upper end portion of the lower peripheral wall portion 31. The outer diameter of the lower peripheral wall portion 31 is formed to be generally the same as the inner diameter of the fitting wall portion 24 of the upper shell 2, and the lower peripheral wall portion 31 is fitted into the fitting wall portion 24 of the upper shell 2.

The upper peripheral wall portion 21 of the upper shell 2 and the lower peripheral wall portion 31 of the lower shell 3 form a peripheral wall portion having a cylindrical shape that connects the top plate portion 22 and the bottom plate portion 32 in the housing 1. In other words, the housing 1 is configured to have the peripheral wall portion having a cylindrical shape, the top plate portion 22 that closes one end portion of the peripheral wall portion, and the bottom plate portion 32 that defines, by closing the other end portion, the internal space of the housing 1 together with the peripheral wall portion and the top plate portion 22. A plurality of the gas discharge ports 13 are formed side by side in a circumferential direction in the upper peripheral wall portion 21 of the upper shell 2. The gas discharge ports 13 are closed by a seal tape 14. As the seal tape 14, aluminum foil or the like having one side coated with an adhesive member is used. Thus, the airtightness of the housing 1 is ensured.

[Partition Wall Member]

The partition wall member 4 is a member that defines the first combustion chamber 11 and the second combustion chamber 12 in the housing 1. The partition wall member 4 has a disc-shaped dividing wall 41 extending in a direction substantially orthogonal to the axial direction of the housing 1 and dividing the internal space of the housing 1 upper and lower parts, a cylindrical fitting wall portion 42 connected to the dividing wall 41 and extending substantially upward from the peripheral edge of the dividing wall 41 along the inner peripheral surface of the lower peripheral wall portion 31 of the lower shell 3, and a terminal portion 43 connected to the fitting wall portion 42 and extending radially outward of the housing 1 from an upper end of the fitting wall portion 42. As illustrated in FIG. 1, the terminal portion 43 is disposed on the upper end surface of the lower peripheral wall portion 31 of the lower shell 3, and thus the partition wall member 4 is supported by the lower shell 3. In addition, a through hole 411 through which the first inner cylindrical member 5 passes is formed in the dividing wall 41. Further, at a position of the dividing wall 41 facing a protruding surface 72a of the second inner cylindrical member 7, which will be described later, a recessed portion 41a recessed on the side of the first combustion chamber 11 is formed so as to correspond to the protruding surface 72a.

As illustrated in FIG. 1, the internal space of the housing 1 is divided by the partition wall member 4 into the first combustion chamber 11 located on the side of the the top plate portion 22 (upper side) in the axial direction of the housing 1 and the second combustion chamber 12 located on the side of the bottom plate portion 32 (lower side) in the axial direction of the housing 1. The first combustion chamber 11 accommodates the first ignition device 10 and the first gas generating agent 110. Between the top plate portion 22 and the first gas generating agent 110 in the first combustion chamber 11, a retainer R1 that presses the first gas generating agent 110 is disposed in order to suppress the vibration of the first gas generating agent 110. Further, the first combustion chamber 11 communicates with the outside of the housing 1 (i.e., the outside of the gas generator 100) through the gas discharge ports 13. The second combustion chamber 12 accommodates the second ignition device 20 and the second gas generating agent 120. Between the partition wall member 4 and the second gas generating agent 120 in the second combustion chamber 12, a retainer R2 that presses the second gas generating agent 120 is disposed in order to suppress the vibration of the second gas generating agent 120.

[First Ignition Device]

The first ignition device 10 is fixed in the first fitting hole 32a formed in the bottom plate portion 32 of the lower shell 3. As illustrated in FIG. 1, the first ignition device 10 includes the first igniter 101 having a metal cup body C1 filled with an ignition charge. When the first igniter 101 is actuated, the ignition charge is burned, and the combustion product is discharged to the outside of the cup body C1. A known technique can be appropriately selected for the first ignition device 10.

[First Inner Cylindrical Member]

The first inner cylindrical member 5 is a cylindrical member that accommodates the first ignition device 10 inside. The first inner cylindrical member 5 has a lower-part peripheral wall portion 51 whose lower end abuts on the bottom plate portion 32 of the lower shell 3, a connecting portion 52 connected to the lower-part peripheral wall portion 51, an upper-part peripheral wall portion 53 that is connected to the connecting portion 52 and has a reduced diameter than that of the lower-part peripheral wall portion 51 and extends upward from the connecting portion 52, and a distal end portion 54 that is connected to the upper-part peripheral wall portion 53 and bends inward from the upper-part peripheral wall portion 53 to terminate, and forms an opening portion of the first inner cylindrical member 5 by an end edge thereof. As illustrated in FIG. 1, the first inner cylindrical member 5 is fitted with the first ignition device 10 fixed in the first fitting hole 32a so that the lower-part peripheral wall portion 51 abuts in the vicinity of the first fitting hole 32a in the bottom plate portion 32 of the lower shell 3, and is in a state in which the lower-part peripheral wall portion 51 and the upper-part peripheral wall portion 53 extend upward toward the top plate portion 22 of the upper shell 2. Further, in the first inner cylindrical member 5, the upper-part peripheral wall portion 53 and the distal end portion 54 pass through the through hole 411 so as to protrude into the first combustion chamber 11, and the internal space of the first inner cylindrical member 5 is connected to the internal space of the upper peripheral wall portion 21 of the upper shell 2 through the opening portion formed by the distal end portion 54, thereby forming part of the first combustion chamber 11.

Here, a gap is formed between the upper-part peripheral wall portion 53 of the first inner cylindrical member 5 and an inner wall of the through hole 411, and the gap forms a communication hole 15 that communicates the first combustion chamber 11 and the second combustion chamber 12. The communication hole 15 is closed by a closing member 151 and thus the communication hole 15 does not open when the first gas generating agent 110 is burned, but opens when the second gas generating agent 120 is burned. The closing member 151 moves by receiving the combustion pressure of the combustion gas of the second gas generating agent 120 to open the communication hole 15. Further, the closing member 151 may be, for example, a seal tape that closes the communication hole 15 from the side of the first combustion chamber 11 and is ruptured by the combustion pressure of the combustion gas of the second gas generating agent 120. Note that a method of communicating the first combustion chamber 11 and the second combustion chamber 12 is not limited to the method of forming a gap between the first inner cylindrical member 5 and the partition wall member 4, and can be appropriately changed as long as the first combustion chamber 11 and the second combustion chamber 12 can communicate with each other. For example, the first combustion chamber 11 and the second combustion chamber 12 may communicate with each other by a through hole being provided in the partition wall member 4 or the first inner cylindrical member 5.

[Partition Member]

As illustrated in FIG. 1, the partition member 6 that partitions the internal space of the first inner cylindrical member 5 into upper and lower parts is disposed inside the first inner cylindrical member 5. A first transfer charge G1 that is burned by actuating the first igniter 101 and burns the first gas generating agent 110 by the combustion gas thereof is accommodated without mixing the first gas generating agent 110 in the transfer charge chamber 111, which is the space below the partition member 6 (lower shell 3 side) in the internal space of the first inner cylindrical member 5. The partition member 6 is formed of a material that is quickly burned, melted, or removed by the combustion gas of the first transfer charge G1 so as not to prevent the ignition of the first gas generating agent 110 by the combustion gas of the first transfer charge G1. The vertical position of the partition member 6 can be appropriately changed in accordance with the amounts of the first transfer charge G1 and the first gas generating agent 110, contained in the first combustion chamber 11.

[Second Ignition Device]

Figure 2:
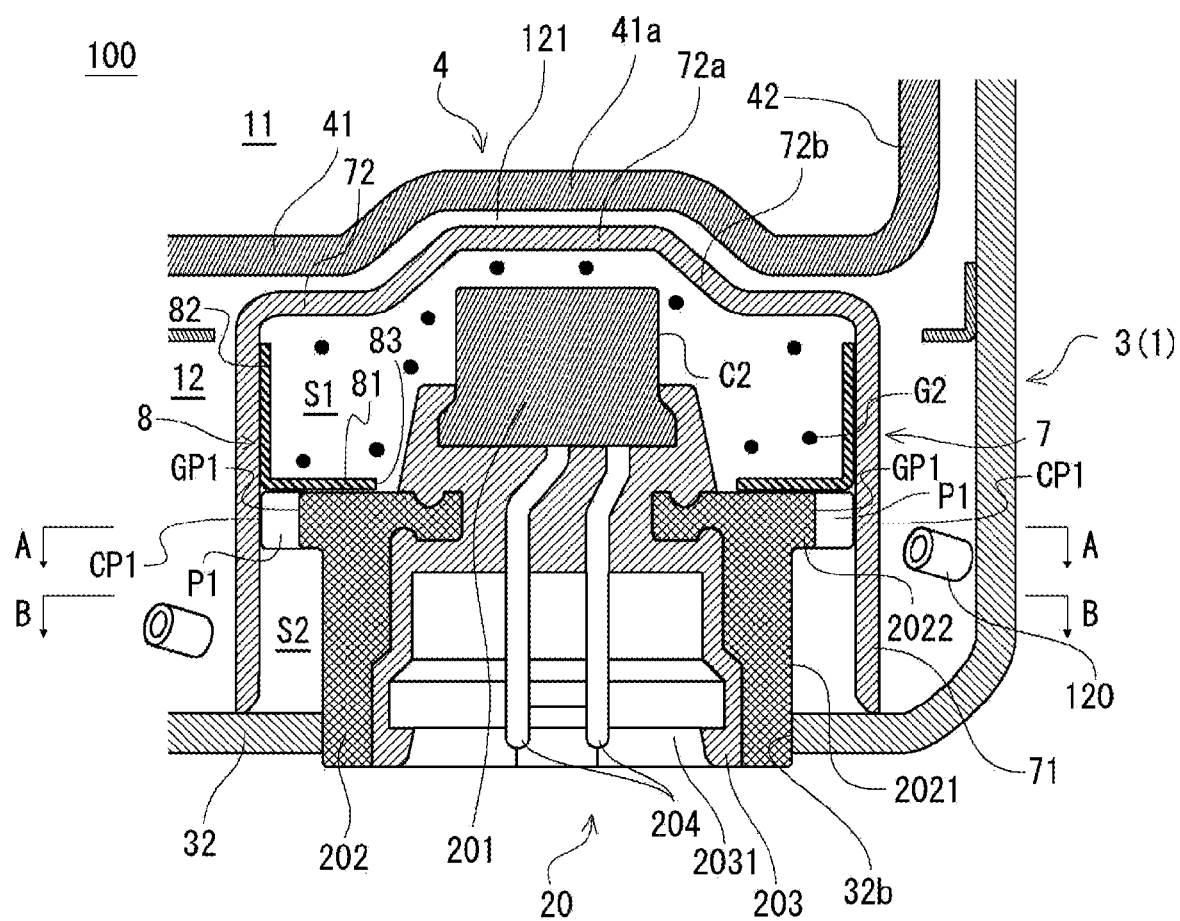
FIG. 2 is a diagram for explaining a structure in the vicinity of a second ignition device in the gas generator according to the first embodiment.

The second ignition device 20 is fixed in the second fitting hole 32b formed in the bottom plate portion 32 of the lower shell 3. FIG. 2 is a diagram for explaining a structure in the vicinity of the second ignition device 20 in the gas generator 100 according to the first embodiment. FIG. 2 illustrates a state before the second igniter 201 is actuated. As illustrated in FIG. 2, the second ignition device 20 includes the second igniter 201, a collar 202 formed in the housing 1 and supporting the second igniter 201, a holding part 203 made of a resin material, which fixes the second igniter 201 to the collar 202, and a pair of conductive pins 204 and 204 for supplying an external current to the second igniter 201. The second ignition device 20 is an example of the "ignition device" according to the present disclosure.

The second igniter 201 has a metal cup body C2 filled with an ignition charge, and when the second igniter 201 is actuated, the ignition charge is burned, and the combustion product thereof is discharged to the outside of the cup body C2. The pair of conductive pins 204 and 204 extend downward from a lower portion of the second igniter 201. The second igniter 201 is an example of the "igniter" according to the present disclosure.

The collar 202 is formed with a cylindrical portion 2021 having a substantially cylindrical shape with a lower end portion fitted into the second fitting hole 32b, and a flange portion 2022 protruding outward from an upper end portion of the cylindrical portion 2021. The collar 202 is fixed to the bottom plate portion 32 of the lower shell 3 by being welded to an inner wall of the second fitting hole 32b in a state where the cylindrical portion 2021 is fitted to the second fitting hole 32b. The collar 202 is an example of the "igniter support" according to the present disclosure. Note that the igniter support may be formed in the housing, and may be integrally formed with the housing (in the example, the lower shell 3 of the housing 1).

The holding part 203 is a resin member interposed between the second igniter 201 and the collar 202 to fix the second igniter 201 to the collar 202. The holding part 203 covers a lower portion of the second igniter 201 and engages with an inner peripheral surface of the collar 202 to secure the second igniter 201 to the collar 202 such that at least part of the cup body C2 is exposed from the holding part 203. A connector insertion space 2031 into which a connector (not illustrated) for supplying power from an external power source to the pair of conductive pins 204 and 204 can be inserted is formed at the lower end of the holding part 203. The holding part 203 partially covers and holds the pair of conductive pins 204 and 204 so that lower ends of the pair of conductive pins 204 and 204 are exposed in the connector insertion space 2031. The holding part 203 maintains the insulation between the pair of conductive pins 204 and 204.

[Second Inner Cylindrical Member]

The second inner cylindrical member 7 is a member that has a cylindrical peripheral wall portion 71 and a lid wall portion 72 that closes one end of the peripheral wall portion 71, and accommodates the second ignition device 20 therein. The second inner cylindrical member 7 is press-fitted into the flange portion 2022 of the second ignition device 20 so that another end portion (lower end portion) of the peripheral wall portion 71 abuts on the bottom plate portion 32 of the lower shell 3, and the peripheral wall portion 71 is in a state of extending upward toward the dividing wall 41 of the partition wall member 4. The second gas generating agent 120 is disposed on the outer side of the second inner cylindrical member 7 and surrounds the second inner cylindrical member 7. Further, the second inner cylindrical member 7 forms the transfer charge chamber S1 inside the second inner cylindrical member 7, with the second ignition device 20. The transfer charge chamber S1 is filled with the second transfer charge G2 that is burned by actuating the second igniter 201 and burns the second gas generating agent 120 with the combustion gas thereof. Further, the lid wall portion 72 of the second inner cylindrical member 7 is separated from the dividing wall 41 of the partition wall member 4, thereby forming a gap 121 with the dividing wall 41. The distance between the lid wall portion 72 and the dividing wall 41 is set so that the second gas generating agent 120 does not enter the gap 121. Further, as will be described in detail later, in the gas generator 100, a fitting state between the flange portion 2022 and the peripheral wall portion 71 is set so that the second inner cylindrical member 7 can move upward along the axial direction when the second transfer charge G2 in the transfer charge chamber S1 is burned and the second inner cylindrical member 7 receives the combustion pressure of the second transfer charge G2. The upper limit of the upward movement distance of the second inner cylindrical member 7 is determined by the distance between the lid wall portion 72 and the dividing wall 41. Further, the protruding surface 72a is formed by a portion of the lid wall portion 72 facing the second igniter 201 being protruded toward the partition wall member 4. An annular inclined surface 72b surrounds the protruding surface 72a. The second inner cylindrical member 7 is an example of the "inner cylindrical member" according to the present disclosure.

[Transfer Charge Chamber and Flow Space]

As illustrated in FIG. 2, the second ignition device 20 and the second inner cylindrical member 7 are assembled and a space is formed therebetween. At this time, the flange portion 2022 of the collar 202 protrudes toward the peripheral wall portion 71 of the second inner cylindrical member 7 and fits with the peripheral wall portion 71, and thus the space between the second ignition device 20 and the second inner cylindrical member 7 is divided, by the flange portion 2022, into the transfer charge chamber S1, which is a space on the side of the lid wall portion 72, and the flow space S2, which is a space on the side of the lower end portion of the peripheral wall portion 71. The transfer charge chamber S1 and the flow space S2 are formed inside (inner side of) the second inner cylindrical member 7. More specifically, the transfer charge chamber S1 is formed by being surrounded by the peripheral wall portion 71, the lid wall portion 72, the second igniter 201, the collar 202, and the holding part 203, and the transfer charge chamber S1 is filled with the second transfer charge G2 and thus surrounds the second igniter 201. On the other hand, the flow space S2 is formed in an annular shape by being surrounded by the peripheral wall portion 71, the collar 202, the holding part 203, and the lower shell 3, and the second transfer charge G2 is not contained in the flow space S2.

Figure 3:
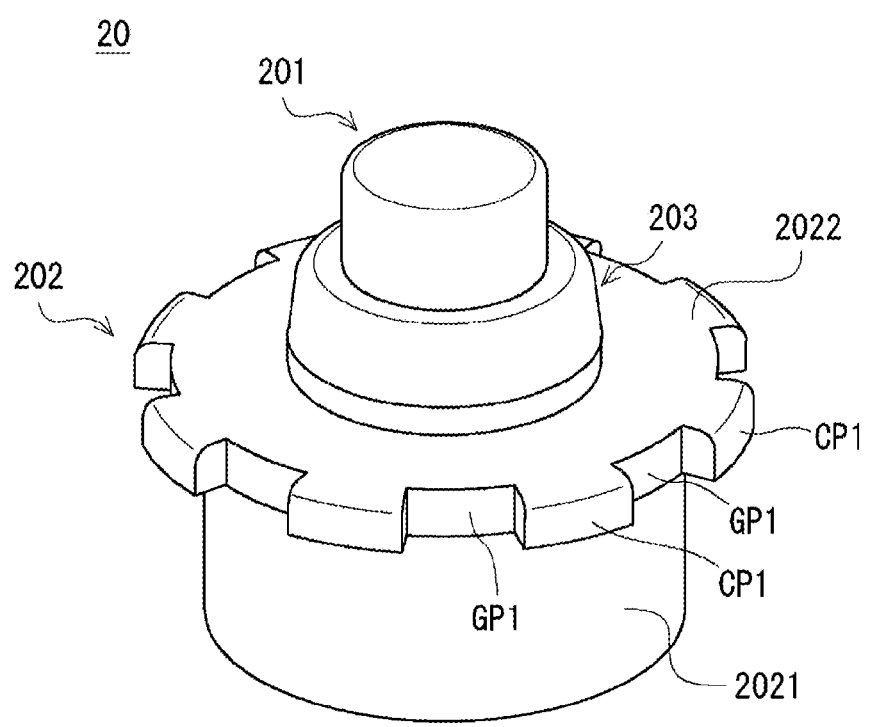
FIG. 3 is a perspective view of the second ignition device according to the first embodiment.

Here, FIG. 3 is a perspective view of the second ignition device 20 according to the first embodiment. As illustrated in FIG. 3, an outer peripheral surface of the flange portion 2022 is formed in a comb shape. More specifically, a plurality of flange-side contact portions CP1 and a plurality of flange-side gap forming portions GP1 recessed from the flange-side contact portions CP1 are formed alternately in the circumferential direction on the outer peripheral surface of the flange portion 2022. The flange-side contact portion CP1 is a portion that forms a fitted state between the flange portion 2022 and the peripheral wall portion 71 by abutting on the peripheral wall portion 71 of the second inner cylindrical member 7. The flange-side gap forming portion GP1 is a portion that forms a gap between the flange-side gap forming portion GP1 and the peripheral wall portion 71 by being located radially inside the flange-side contact portion CP1. As a result, as illustrated in FIG. 2, in the gas generator 100, the flange portion 2022 and the peripheral wall portion 71 are in a state of being fitted with a gap at least partially. This gap formed between the flange portion 2022 and the peripheral wall portion 71 forms an inflow path P1, which is a flow path that allows the combustion gas of the second transfer charge G2 to flow from the transfer charge chamber S1 into the flow space S2 when the second igniter 201 is actuated. In other words, the transfer charge chamber S1 and the flow space S2 are communicated with each other by the inflow path P1. The number of the inflow paths P1 corresponds to the number of the flange-side gap forming portions GP1, and in this example, a plurality of inflow paths P1 are formed.

Figure 4:
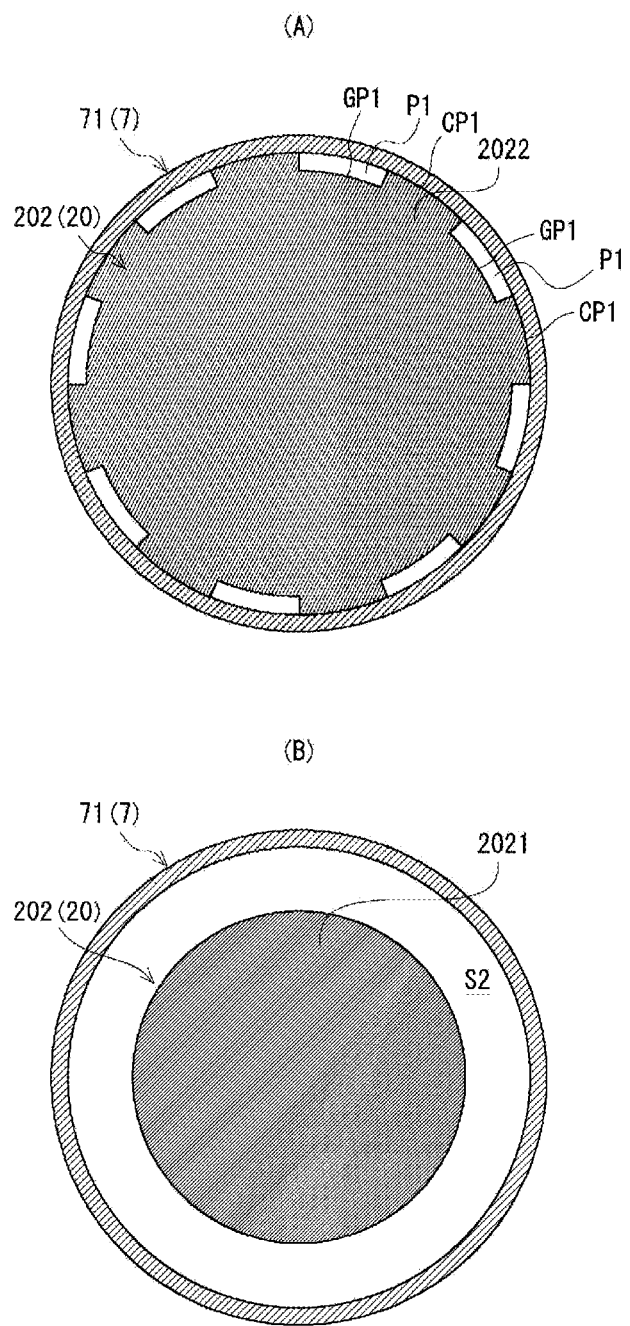
FIG. 4(A) is a cross-sectional view taken along line A-A of FIG. 2.
FIG. 4(B) is a cross-sectional view taken along line B-B of FIG. 2.

The combustion gas of the second transfer charge G2 flowing from the transfer charge chamber S1 into the flow space S2 flows into the flow space S2 through the inflow path P1 in a direction from the transfer charge chamber S1 toward the flow space S2, that is, substantially along the axial direction of the peripheral wall portion 71. FIG. 4 is a view illustrating a cross section of the peripheral wall portion 71 orthogonal to the axial direction. FIG. 4(A) is a cross-sectional view taken along line A-A of FIG. 2, and FIG. 4(B) is a cross-sectional view taken along line B-B of FIG. 2. FIG. 4 illustrates the collar 202 and the second inner cylindrical member 7 with the other components omitted.

Here, unless otherwise specified, the "cross-sectional area of the inflow path" in the present specification is a flow path area of the inflow path, and refers to an area in a cross section substantially orthogonal to the flow direction when the combustion gas of the transfer charge flows through the inflow path. Similarly, the "cross-sectional area of the flow space" refers to an area in a cross section substantially orthogonal to the flow direction when the combustion gas of the transfer charge flows through the flow space. In this example, the "cross-sectional area" of the inflow path P1 refers to an area of the inflow path P1 in a cross section substantially orthogonal to the axial direction of the peripheral wall portion 71, and the "cross-sectional area" of the flow space S2 refers to an area of the flow space S2 in a cross section substantially orthogonal to the axial direction of the peripheral wall portion 71. Additionally, the "total cross-sectional area of the inflow path" refers to a total area of the cross-sectional areas of all the inflow paths formed in the gas generator. When a plurality of inflow paths are formed as in this example, the sum of the cross-sectional areas of the respective inflow paths is the total cross-sectional area, and when only one inflow path is formed, the cross-sectional area of this inflow path is the total cross-sectional area. As illustrated in FIGS. 4(A) and 4(B), the gas generator 100 is configured such that the total cross-sectional area of the inflow path P1 is smaller than the cross-sectional area of the flow space S2.

[Seal Cup]

As illustrated in FIG. 2, a metal (for example, aluminum) seal cup indicated by reference numeral 8 is disposed in the transfer charge chamber S1. The seal cup 8 has a function of increasing the pressure of the transfer charge chamber S1 at the initial stage of combustion to a predetermined value (pressure holding function), and is configured to have a disc-shaped bottom surface portion 81 and a cylindrical wall portion 82 extending from a peripheral edge of the bottom surface portion 81. A through hole 83 is formed in the bottom surface portion 81, and the seal cup 8 is provided in a state where the second igniter 201 passes through the through hole 83 and the bottom surface portion 81 is placed on a top surface of the flange portion 2022. The inflow path P1 is closed by the bottom surface portion 81 covering the inflow path P1. With this configuration, the second transfer charge G2 is retained by the seal cup 8, and the second transfer charge G2 in the transfer charge chamber S1 is suppressed from entering the flow space S2 through the inflow path P1. Further, the cylindrical wall portion 82 is abutted on the peripheral wall portion 71 of the second inner cylindrical member 7. The seal cup 8 is configured to allow the combustion gas to flow from the transfer charge chamber S1 into the flow space S2 through the inflow path P1 by rupturing or deforming the seal cup 8 when the internal pressure of the transfer charge chamber S1 reaches a predetermined value or more due to the combustion of the first transfer charge G1. With this configuration, the combustion pressure of the combustion gas of the second transfer charge G2 can be increased to a predetermined value. Note that the seal cup 8 is not an essential configuration for the technique of the present disclosure. The gas generator may be of another configuration having the above-described pressure holding function instead of the seal cup 8. However, when the gas generator does not include the seal cup 8, it is preferable that the size of the inflow path P1 be smaller than that of the second transfer charge G2, or a wire mesh having a mesh opening smaller than the size of the second transfer charge G2 be disposed in the transfer charge chamber S1, so as to prevent the second transfer charge G2 in the transfer charge chamber S1 from entering the flow space S2 through the inflow path P1.

[Filter]

As illustrated in FIG. 1, the filter 9 has a cylindrical shape, and is disposed between the first gas generating agent 110 and the gas discharge ports 13 in a state where an upper end portion is supported by the top plate portion 22 of the upper shell 2 and a lower end portion is supported by an annular step portion of the fitting wall portion 42 of the partition wall member 4. The filter 9 is configured so that the combustion gas can pass through, and the combustion gases generated in the first combustion chamber 11 and the second combustion chamber 12 are cooled by passing through the filter 9. At this time, the filter 9 filters the combustion gas by filtering the combustion residue of the combustion gas. Further, an annular gap 16 is formed between the filter 9 and the upper peripheral wall portion 21 in which the gas discharge ports 13 are formed.

[Gas Generator]

As described above, the gas generator 100 is configured as a dual stage gas generator including two igniters (first ignition device 10 and second ignition device 20). In the gas generator 100, when a sensor (not illustrated) senses an impact, a predetermined signal is sent to the respective igniters, and thus the first igniter 101 of the first ignition device 10 is actuated, and the second igniter 201 of the second ignition device 20 is actuated after the actuation timing of the first igniter 101. The gas generator 100 can generate a relatively large amount of combustion gas by the combustion of the first gas generating agent 110 by actuating the first igniter 101 and the combustion of the second gas generating agent 120 by actuating the second igniter 201, and discharge the combustion gas to the outside through the gas discharge ports 13. In the present embodiment, the second igniter 201 is actuated independently of the first igniter 101, and when the second igniter 201 is actuated, the second igniter 201 is actuated at a predetermined timing after the first igniter 101 is actuated. The combustion timing of the gas generating agent in each combustion chamber is correlated with the discharge timing of the combustion gas to the outside. Thus, the actuation timing of each igniter is determined in accordance with the discharge characteristics of the combustion gas required of the gas generator 100. Note that the second igniter 201 is not always actuated, and may also be actuated simultaneously with the first igniter 101. In response to the magnitude of the impact sensed by the sensor (not illustrated), the gas generator 100 can actuate only the first igniter 101 without actuating the second igniter 201 when the impact is weak, or can simultaneously actuate the first igniter 101 and the second igniter 201 when the impact is strong.

OPERATION EXAMPLE

The gas generator 100 according to the present embodiment can slow down the flow rate of the combustion gas of the second transfer charge G2, and can suppress damage and the like to the second gas generating agent 120. Hereinafter, the operation of the gas generator 100 will be described focusing on the operation when the second igniter 201 is actuated and the second transfer charge G2 is burned. In this example, a case in which the second ignition device 20 is actuated following the first ignition device 10 (that is, after the first ignition device 10 is actuated) will be described.

First, when the first igniter 101 of the first ignition device 10 is actuated, the first transfer charge G1 filled in the transfer charge chamber 111 of the first combustion chamber 11 is burned. When the partition member 6 is burned and removed by the combustion gas of the first transfer charge G1, the combustion gas comes into contact with the first gas generating agent 110 and the first gas generating agent 110 is ignited. When the first gas generating agent 110 is burned, high-temperature and high-pressure combustion gas is generated in the first combustion chamber 11. When this combustion gas passes through the filter 9, the combustion gas is cooled, and the combustion residue is filtered. The combustion gas of the first gas generating agent 110 cooled and filtered by the filter 9 passes through the gap 16, ruptures the seal tape 14 and is discharged from the gas discharge ports 13 to the outside of the housing 1.

Figure 5:
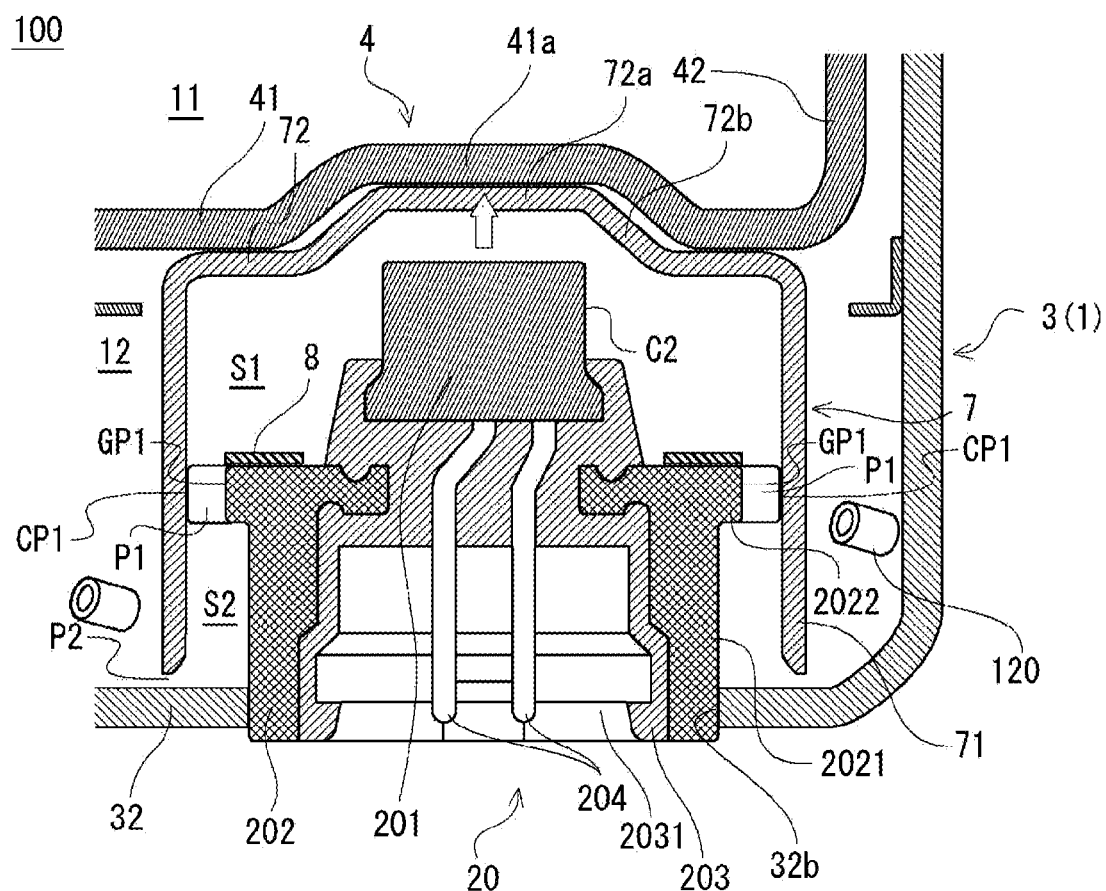
FIG. 5 is a diagram for explaining a state when a second igniter is actuated, and a second transfer charge is burned in the first embodiment.

Subsequently, when the second igniter 201 of the second ignition device 20 is actuated, the second transfer charge G2 filled in the transfer charge chamber S1 of the second combustion chamber 12 is burned. FIG. 5 is a diagram for explaining a state when the second igniter 201 is actuated and the second transfer charge G2 is burned according to the first embodiment. Immediately after the combustion of the second transfer charge G2 starts, the inflow path P1 that communicates the transfer charge chamber S1 and the flow space S2 is closed by the seal cup 8, so that the combustion gas of the second transfer charge G2 cannot flow out, thereby increasing the combustion pressure inside the transfer charge chamber S1. When the internal pressure of the transfer charge chamber S1 reaches the predetermined value or more, as illustrated in FIG. 5, the seal cup 8 is ruptured and the combustion gas of the second transfer charge G2 can flow from the transfer charge chamber S1 into the flow space S2 through the inflow path P1. On the other hand, the second inner cylindrical member 7 that receives the combustion pressure of the second transfer charge G2 moves upward along the axial direction while maintaining the fitting with the flange portion 2022, so that the lower end portion of the peripheral wall portion 71 is separated from the bottom plate portion 32, whereby an annular gap is formed between the lower end portion of the peripheral wall portion 71 and the bottom plate portion 32 of the lower shell 3. Further, the lid wall portion 72 hits against the dividing wall 41 of the partition wall member 4, thereby stopping the movement of the second inner cylindrical member 7 in the upward direction. This gap forms an outflow path indicated by the reference sign P2. As a result, the combustion gas of the second transfer charge G2 can flow out from the flow space S2 to the outside of the second inner cylindrical member 7 through the outflow path P2. The combustion gas of the second transfer charge G2 generated in the transfer charge chamber S1 flows into the flow space S2 through the inflow path P1, temporarily stays in the flow space S2, and then flows out to the outside of the second inner cylindrical member 7 through the outflow path P2. In other words, the combustion gas is not directly ejected from the transfer charge chamber S1 to the outside of the second inner cylindrical member 7, but is ejected after passing through the flow space S2. At this time, as described above, in this example, the portion of the lid wall portion 72 facing the second igniter 201 forms the protruding surface 72a that protrudes toward the partition wall member 4, and the protruding surface 72a is surrounded by the annular inclined surface 72b. Thus, the combustion product of the ignition charge generated from the cup body C2 of the second igniter 201 is reflected by the protruding surface 72a and the annular inclined surface 72b, and efficiently ignites the second transfer charge G2 present on the side of the seal cup 8.

The combustion gas of the second transfer charge G2 flowing out from the outflow path P2 flows radially outward in the radial direction of the peripheral wall portion 71. This combustion gas burns the second gas generating agent 120 disposed around the second inner cylindrical member 7, and high-temperature and high-pressure combustion gas is generated in the second combustion chamber 12. Here, as described above, since the total cross-sectional area of the inflow path P1 is configured to be smaller than the cross-sectional area of the flow space S2, the flow rate of the combustion gas of the second transfer charge G2 in the flow space S2 is lower than the flow rate in the inflow path P1. In other words, the combustion gas is decelerated in the flow space S2. As a result, the combustion gas of the second transfer charge G2 flowing out from the outflow path P2 is decelerated. Therefore, it is suppressed that the second gas generating agent 120 is damaged due to the impact of the combustion gas.

The combustion gas of the second gas generating agent 120 moves to the first combustion chamber 11 through the communication hole 15, is cooled and filtered by the filter 9, passes through the gap 16, and is discharged to the outside of the housing 1 through the gas discharge ports 13. The combustion gases of the first gas generating agent 110 and the second gas generating agent 120 flow into the airbag (not illustrated) after being discharged to the outside of the housing 1. This causes the airbag to inflate, forming a cushion between the occupant and the rigid structure and protecting the occupant from the impact.

[Actions and Effects]

As described above, in the gas generator 100 according to the present embodiment, between the second ignition device 20 and the second inner cylindrical member 7, the transfer charge chamber S1 is formed on the side of the lid wall portion 72 and the flow space S2 is formed on the side of the lower end portion of the peripheral wall portion 71. The flow space S2 is configured so that the combustion gas of the second transfer charge G2 can flow in from the transfer charge chamber S1 when the second igniter 201 is actuated, and is configured so that the combustion gas can flow out to the outside of the second inner cylindrical member 7 when the second igniter 201 is actuated. Then, the total cross-sectional area of the inflow path P1, which is the flow path through which the combustion gas flows from the transfer charge chamber S1 into the flow space S2, is configured to be smaller than the cross-sectional area of the flow space S2. According to such gas generator 100, the combustion gas is not directly discharged from the transfer charge chamber S1 to the outside of the second inner cylindrical member 7, but is passed through the flow space S2 configured so that the cross-sectional area thereof is larger than the total cross-sectional area of the inflow path P1, so that the flow rate of the combustion gas can be decelerated in the flow space S2, and thus the combustion gas flowing out of the second inner cylindrical member 7 can be decelerated. As a result, damage to the second gas generating agent 120 due to the impact of the combustion gas can be suppressed, and it is possible to stably obtain the desired discharge characteristics.

Here, in the present specification, the "cross-sectional area of the outflow path" is the flow path area of the outflow path P2 unless otherwise specified, and refers to the area in a cross section substantially orthogonal to the flow direction when the combustion gas of the transfer charge flows through the outflow path. In the case of this example, the "cross-sectional area" of the outflow path P2 refers to the area of the outflow path P2 in a cross section substantially orthogonal to the radial direction of the peripheral wall portion 71. Additionally, the "total cross-sectional area of the outflow path" refers to a total area of the cross-sectional areas of all the outflow paths formed in the gas generator. When a plurality of outflow paths are formed, the sum of the cross-sectional areas of the respective outflow paths is the total cross-sectional area, and when only one outflow path is formed as in this example, the cross-sectional area of this outflow path is the total cross-sectional area. At this time, the gas generator 100 is configured such that the total cross-sectional area of the outflow path P2 is equal to or smaller than the cross-sectional area of the flow space S2. With this configuration, the combustion gas can stay easily in the flow space S2, and the flow rate of the combustion gas in the flow space S2 can be suitably reduced. Further, the gas generator 100 is configured such that the total cross-sectional area of the outflow path P2 is larger than the total cross-sectional area of the inflow path P1. With this configuration, the flow rate of the combustion gas flowing out from the outflow path P2 can be further reduced. In other words, in the gas generator, assuming that the total cross-sectional area of the inflow path P1 is AP1, the cross-sectional area of the flow space S2 is AS2, and the total cross-sectional area of the outflow path P2 is AP2, AS2≥AP2 is preferable, and AS2≥AP2>AP1 is more preferable.

Further, in the gas generator 100, when the second inner cylindrical member 7 receives the pressure of the combustion gas and the lower end portion of the peripheral wall portion 71 moves away from the bottom plate portion 32 of the housing 1, the outflow path P2 is formed between the lower end portion of the peripheral wall portion 71 and the bottom plate portion 32. As a result, the outflow path P2 is formed in a substantially annular shape, and the combustion gas can be discharged radially from the outflow path P2. Therefore, the second gas generating agent 120 disposed around the second inner cylindrical member 7 can be efficiently burned. In addition, the communication hole 15, which is the outlet of the combustion gas of the second gas generating agent 120 in the second combustion chamber 12 is formed in the upper part of the second combustion chamber 12. In other words, since the communication hole 15 is formed on the side of the lid wall portion 72 and the outflow path P2 is formed on the side of the lower end portion of the peripheral wall portion 71, the second gas generating agent 120 disposed around the second inner cylindrical member 7 is burned in the order substantially from the lower side to the upper side. As a result, the unburned remains of the second gas generating agent 120 can be reduced. Further, the second inner cylindrical member 7 receives the combustion pressure of the second transfer charge G2 and moves upward along the axial direction while maintaining the fitting with the flange portion 2022. Therefore, while maintaining the total cross-sectional area of the inflow path P1 constant, the change in the cross-sectional area of the flow space S2 due to the movement of the second inner cylindrical member 7 is suppressed. As a result, the pressure in the transfer charge chamber S1 and the flow rate of the combustion gas passing through the inflow path P1 are stable, and thus the discharge characteristics are stabilized.

In addition, in the gas generator 100, the flange-side contact portion CP1 in contact with the peripheral wall portion 71 and the flange-side gap forming portion GP1 that forms the gap between the flange-side gap forming portion GP1 and the peripheral wall portion 71 are formed on the outer peripheral surface of the flange portion 2022. Therefore, the flange portion 2022 and the peripheral wall portion 71 can be fitted to each other with a gap in between at least partially, and the inflow path P1 can be formed by the gap. By forming the gap between the flange portion 2022 and the peripheral wall portion 71, the second inner cylindrical member 7 that receives the combustion pressure of the second transfer charge G2 can easily move upward while maintaining the fitting with the flange portion 2022, and the combustion gas of the second transfer charge G2 can be discharged to the outside of the second inner cylindrical member 7 at an early stage. In addition, the gap between the flange portion 2022 and the peripheral wall portion 71 also has an advantage that the second inner cylindrical member 7 can be easily press-fitted into the flange portion 2022 when the gas generator 100 is assembled.

Note that the flange portion 2022 is not an essential configuration for the technique of the present disclosure. The gas generator may have a configuration in which a transfer charge chamber and a flow space are formed between the ignition device and the inner cylindrical member, and the total cross-sectional area of the inflow path is formed to be smaller than the cross-sectional area of the flow space. The gas generator can define the above-described transfer charge chamber, the flow space, and the inflow path by appropriately adjusting the distance between the ignition device and the inner cylindrical member even without a flange portion. Further, even when the flange portion is provided, the flange portion may not be formed integrally with the collar (igniter support), and the flange portion may be formed by a member separate from the collar.

In addition, the numbers of the inflow paths P1 and the outflow paths P2 are not limited to this example, and can be appropriately set according to the desired total cross-sectional area. In this example, by arranging the plurality of inflow paths P1 at equal distances along the circumferential direction of the peripheral wall portion 71, the combustion gas can be evenly flowed from the transfer charge chamber S1 into the flow space S2. Further, as described above, by appropriately changing the distance between the lid wall portion 72 and the dividing wall 41 within a range such that the second gas generating agent 120 does not enter the gap 121, the total cross-sectional area of the outflow path P2 can be set to a desired size. Furthermore, the technique of the present disclosure does not exclude a case in which a hole for directly connecting the transfer charge chamber S1 and the external space of the second inner cylindrical member 7 is provided in addition to the outflow path P2. For example, a through hole may be provided in the peripheral wall portion 71 or the lid wall portion 72. By letting at least part of the combustion gas generated in the transfer charge chamber pass through the flow space, the gas generator can reduce the flow rate of the part of the gas and suppress the damage of the gas generating agent.

[First Variation]

Hereinafter, a gas generator according to a variation of the first embodiment will be described. In the explanation of the variation, a difference from the gas generator 100 described with reference to FIGS. 1 to 5 will be mainly described, and the similar parts as those of the gas generator 100 are designated by the same reference signs, and detailed description thereof will be omitted.

Figure 6:
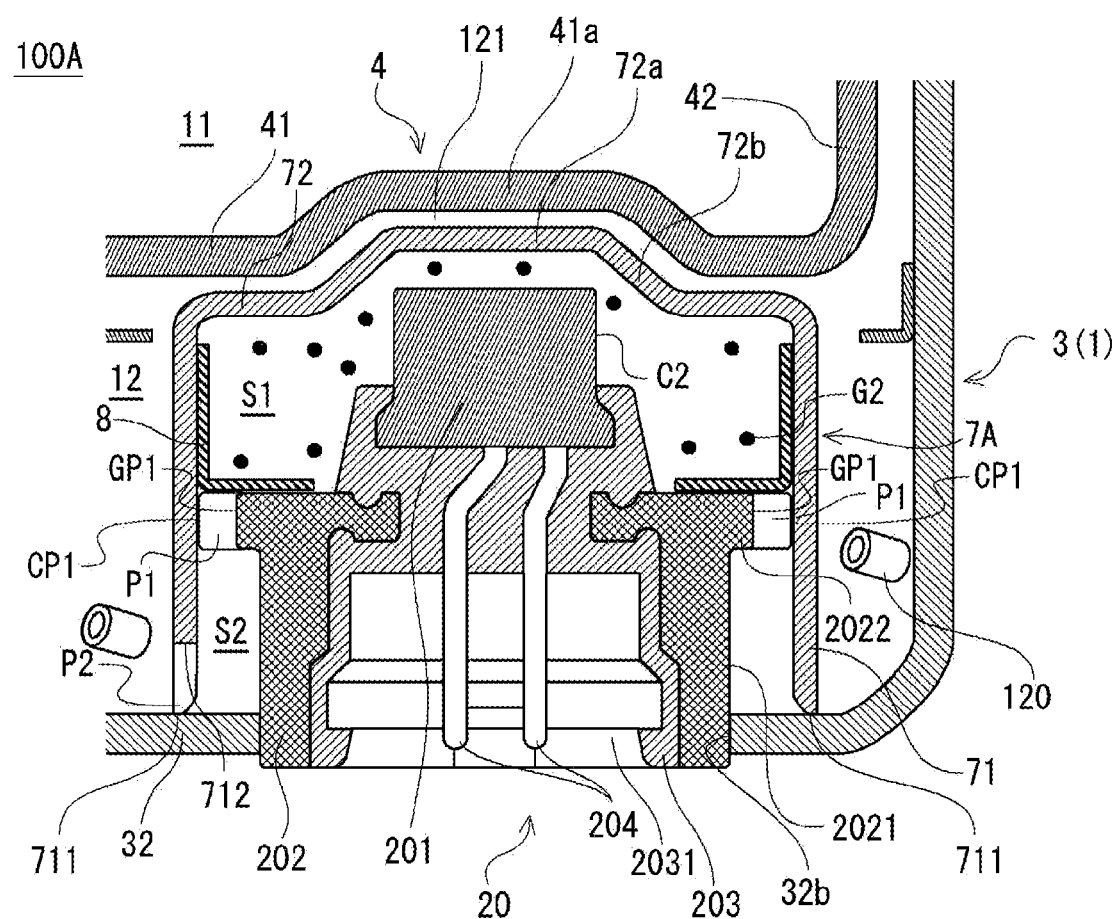
FIG. 6 is a diagram for explaining a structure in the vicinity of a second ignition device in the gas generator according to the first variation of the first embodiment.

FIG. 6 is a diagram for explaining a structure in the vicinity of the second ignition device 20 in a gas generator 100A according to a first variation of the first embodiment. FIG. 6 illustrates a state before the second igniter 201 is actuated. As illustrated in FIG. 6, the gas generator 100A differs from the gas generator 100 in that the outflow path P2 is formed in the state before the second igniter 201 is actuated, and the other configurations are substantially the same.

Figure 7:
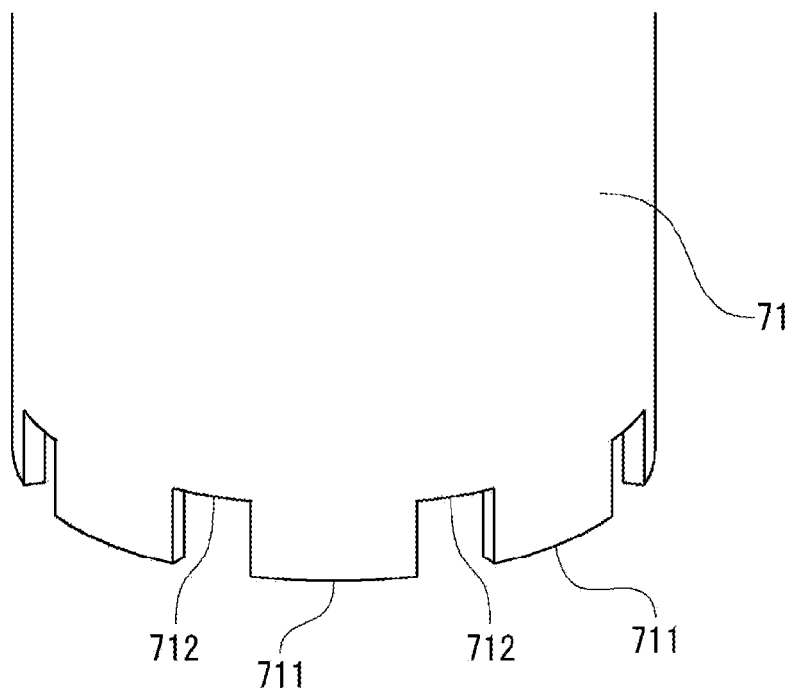
FIG. 7 is a perspective view illustrating the vicinity of a lower end portion of a second inner cylindrical member of the gas generator according to the first variation of the first embodiment.

FIG. 7 is a perspective view illustrating the vicinity of a lower end portion of a second inner cylindrical member 7A of the gas generator 100A according to the first variation of the first embodiment. As illustrated in FIG. 7, at the lower end portion of the second inner cylindrical member 7A, a plurality of contact end portions 711 and a plurality of recessed end portions 712 recessed in the axial direction of the peripheral wall portion 71 from the contact end portions 711 are formed alternately in the circumferential direction. As illustrated in FIG. 6, the second inner cylindrical member 7A is disposed so that the contact end portion 711 abuts on the bottom plate portion 32 of the housing 1. Thereby, a gap is formed between the recessed end portion 712 and the bottom plate portion 32, and the outflow path P2 is formed by the gap.

Similar to the gas generator 100, the gas generator 100A is configured such that the total cross-sectional area of the inflow path P1 is smaller than the cross-sectional area of the flow space S2, whereby the flow rate of the combustion gas can be reduced. Further, in the gas generator 100A, the total cross-sectional area of the outflow path P2, that is, the sum of cross-sectional areas of the respective outflow paths P2 is equal to or smaller than the cross-sectional area of the flow space S2 and larger than the total cross-sectional area of the inflow path P1. With this configuration, the flow rate of the combustion gas can be reduced more preferably. Additionally, in the gas generator 100A, the plurality of outflow paths P2 are arranged at equal distances along the circumferential direction of the peripheral wall portion 71, and thus the combustion gas can be evenly discharged from the flow space S2 to the outside of the second inner cylindrical member 7A. Therefore, the second gas generating agent 120 disposed around the second inner cylindrical member 7A can be efficiently burned. In addition, since the communication hole 15 is formed on the side of the lid wall portion 72 and the outflow path P2 is formed on the side of the lower end portion of the peripheral wall portion 71 as in the gas generator 100, the second gas generating agent 120 disposed around the second inner cylindrical member 7A is burned in order substantially from the lower side to the upper side, whereby the unburned remains of the second gas generating agent 120 can be reduced. Also in the first variation, as with the second inner cylindrical member 7 of the gas generator 100, the second inner cylindrical member 7A may move upward along the axial direction by receiving the combustion pressure of the second transfer charge G2. In this case, the total cross-sectional area of the outflow path P2 can be increased by the gap between the contact end portion 711 of the peripheral wall portion 71 and the bottom plate portion 32 formed by the contact end portion 711 being separated from the bottom plate portion 32.

[Second Variation]

Figure 8:
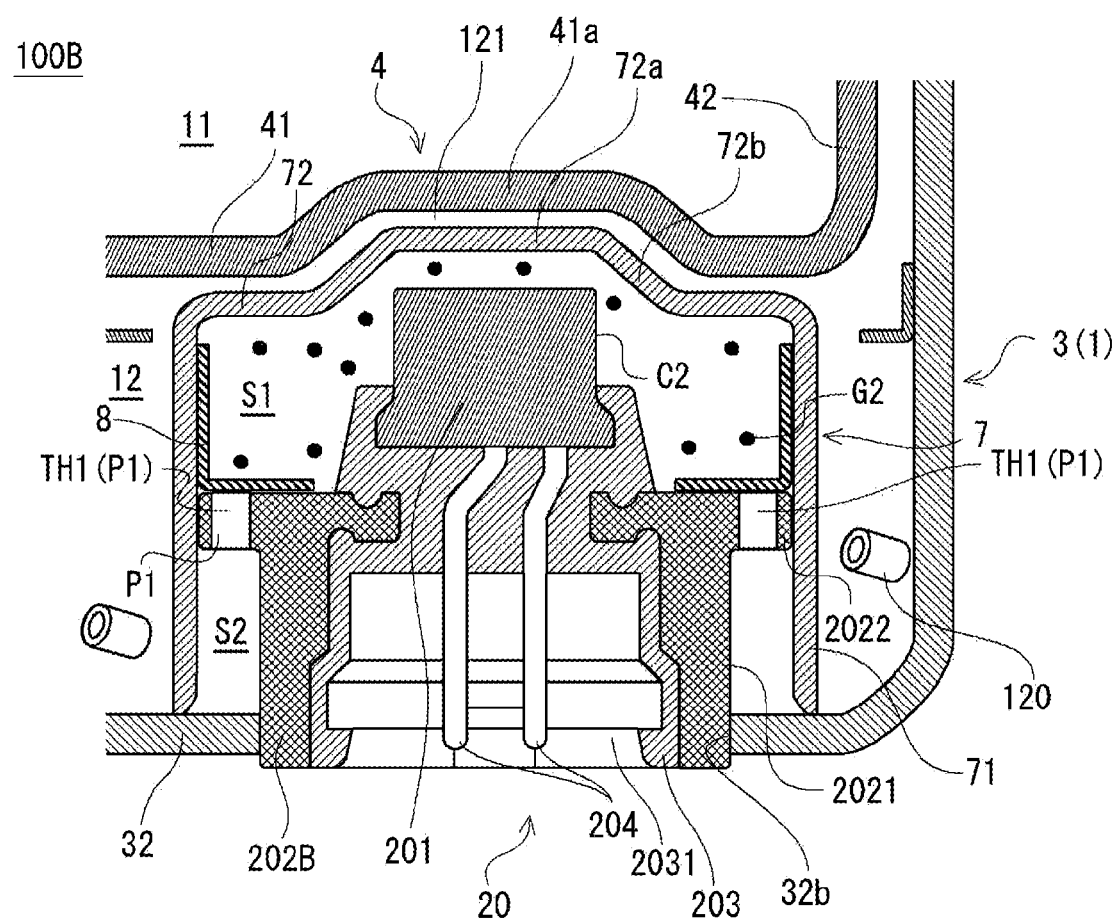
FIG. 8 is a diagram for explaining a structure in the vicinity of a second ignition device in a gas generator according to a second variation of the first embodiment.

FIG. 8 is a diagram for explaining a structure in the vicinity of the second ignition device 20 in a gas generator 100B according to a second variation of the first embodiment. FIG. 8 illustrates a state before the second igniter 201 is actuated. As illustrated in FIG. 8, in the gas generator 100B, similar to the gas generator 100, the flange portion 2022 protruding toward the peripheral wall portion 71 is fitted with the peripheral wall portion 71, thereby separating the transfer charge chamber S1 and the flow space S2 from each other. The gas generator 100B differs from the gas generator 100 in that the inflow path P1 is formed as a through hole passing through the flange portion 2022, and the other configurations are substantially the same.

Figure 9:
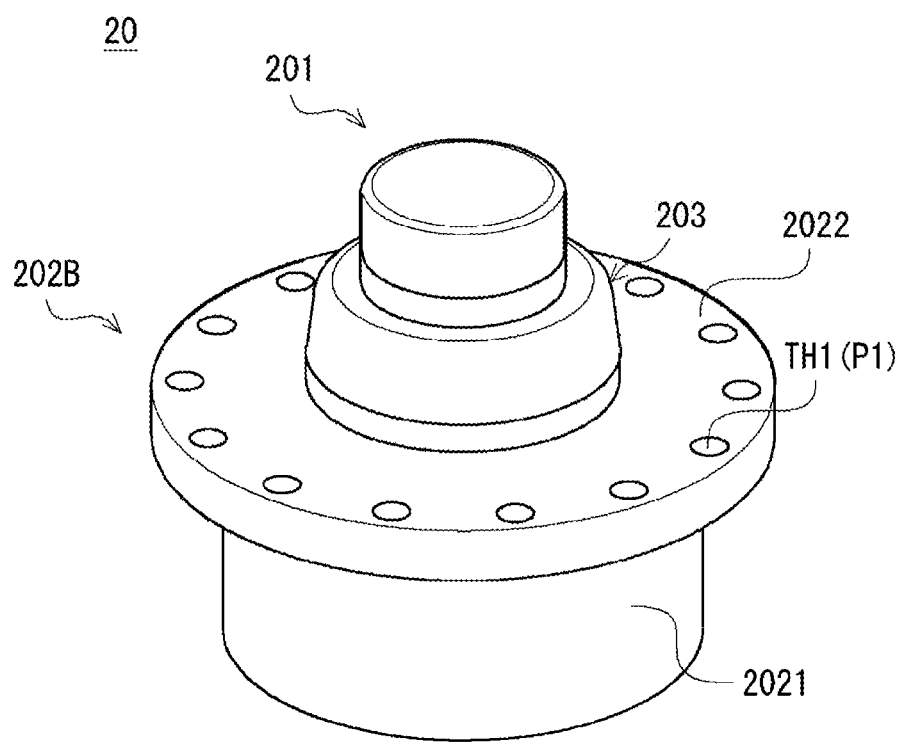
FIG. 9 is a perspective view of the second ignition device according to the second variation of the first embodiment.

FIG. 9 is a perspective view of the second ignition device 20 according to the second variation of the first embodiment. As illustrated in FIG. 9, in the flange portion 2022 of a collar 202B according to the second variation, a plurality of through holes TH1 that pass through the flange portion 2022 in the axial direction are formed so as to be arranged at equal distances along the circumferential direction. As illustrated in FIG. 8, in the gas generator 100B, the inflow path P1 is formed by these through holes TH1. The shape of the through hole TH1 can be selected from various shapes such as a circle, an ellipse, and a rectangle. Note that in the gas generator 100B, the flange portion 2022 and the peripheral wall portion 71 may be fitted with a gap formed therebetween.

[Third Variation]

Figure 10:
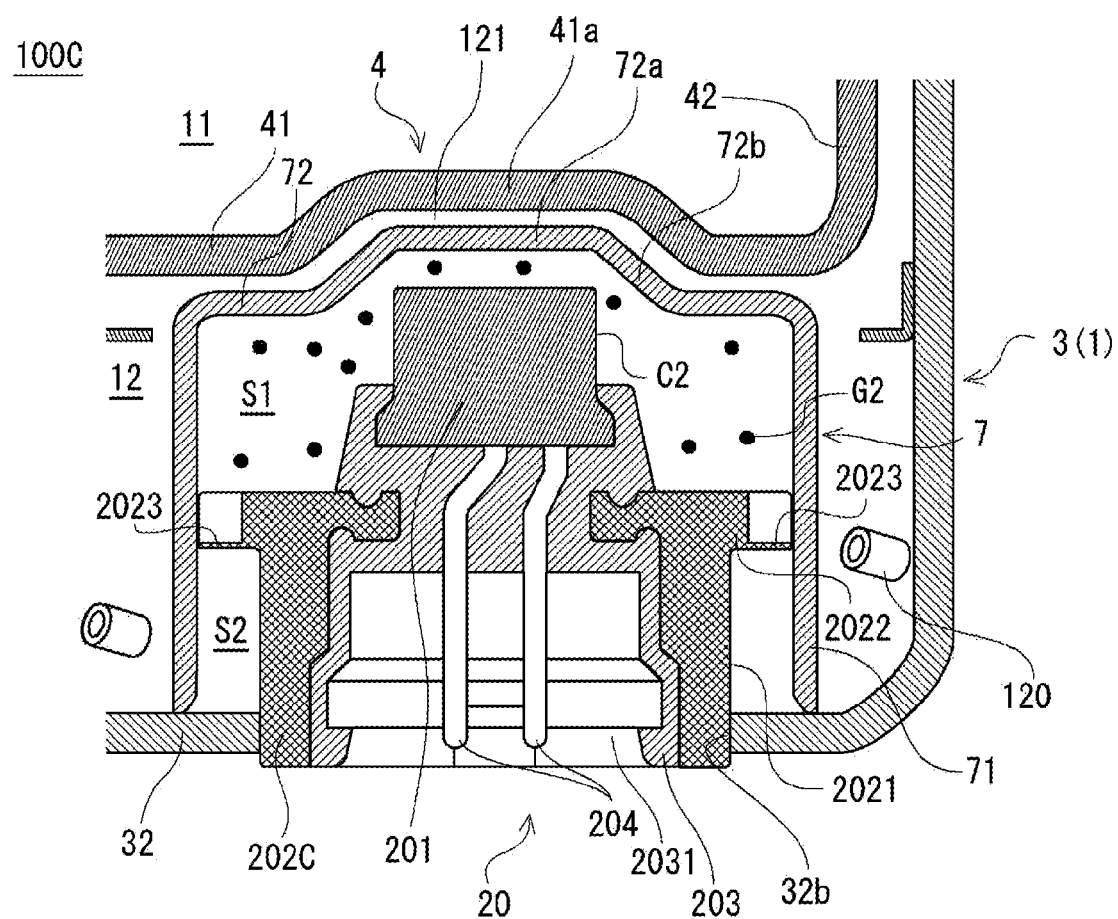
FIG. 10 is a diagram for explaining a structure in the vicinity of a second ignition device in a gas generator according to a third variation of the first embodiment.
Figure 11:
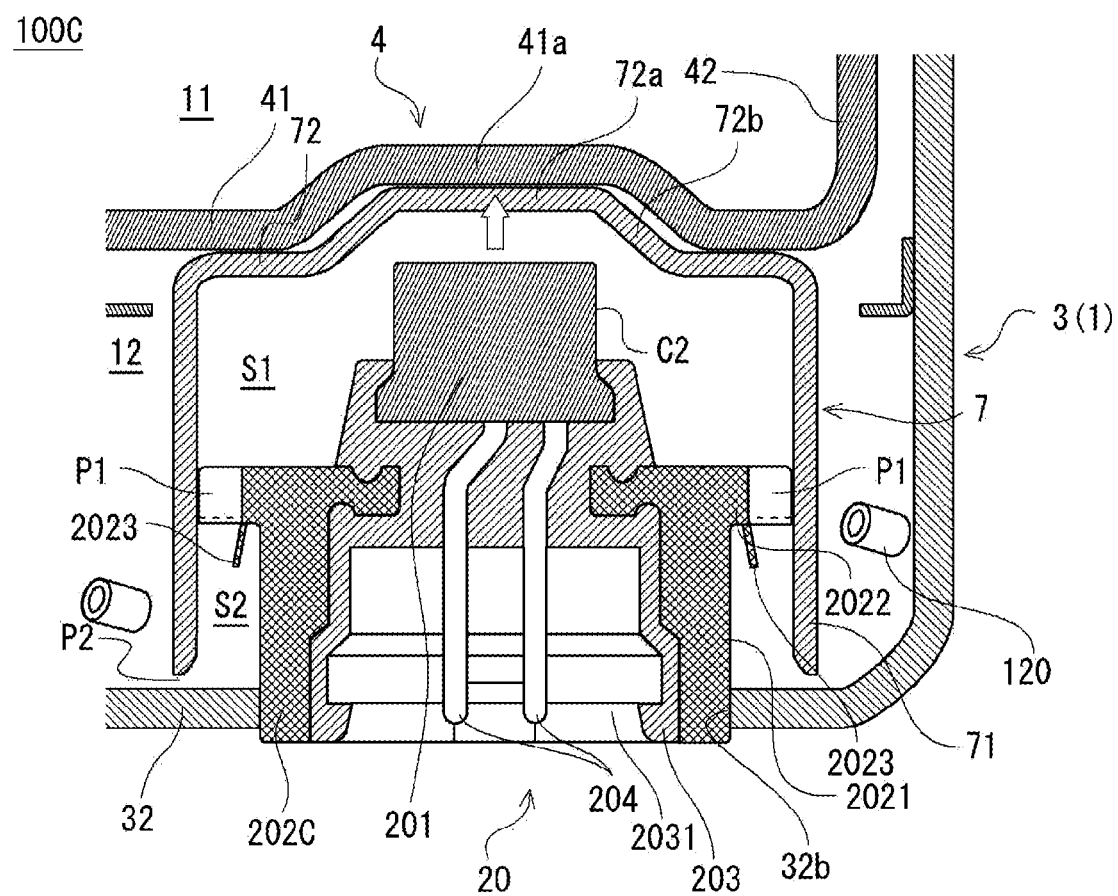
FIG. 11 is a diagram for explaining a state when a second igniter is actuated, and a second transfer charge is burned according to the third variation of the first embodiment.

FIG. 10 is a diagram for explaining a structure in the vicinity of the second ignition device 20 in a gas generator 100C according to a third variation of the first embodiment. FIG. 10 illustrates a state before the second igniter 201 is actuated. Further, FIG. 11 is a diagram for explaining a state when the second igniter 201 is actuated and the second transfer charge G2 is burned according to the third variation of the first embodiment. As illustrated in FIGS. 10 and 11, in the gas generator 100C, similar to the gas generator 100, the flange portion 2022 is fitted with the peripheral wall portion 71, thereby separating the transfer charge chamber S1 and the flow space S2 from each other. The gas generator 100C differs from the gas generator 100 in that the gas generator 100C has a weakened part indicated by reference numeral 2023 without having the seal cup 8, and the other configurations are substantially the same.

As illustrated in FIG. 10, the weakened part 2023 is formed by a portion including part of the outer peripheral edge of the flange portion 2022 of a collar 202C, and is thinner than other portions. Therefore, the weakened part 2023 is more easily deformed than the other portions of the flange portion 2022. Before the second igniter 201 is actuated, the weakened part 2023 abuts on the peripheral wall portion 71 of the second inner cylindrical member 7, thereby separating the transfer charge chamber S1 and the flow space S2. As illustrated in FIG. 11, when the second igniter 201 is actuated, the weakened part 2023 is deformed and bends toward the side of the flow space S2 by receiving the combustion pressure of the second transfer charge G2. As a result, the inflow path P1 is formed, and the combustion gas can flow from the transfer charge chamber S1 into the flow space S2. Note that the weakened part 2023 may be formed to include the entire outer peripheral edge of the flange portion 2022. That is, the weakened part 2023 may be formed over the entire circumference of the peripheral edge portion of the flange portion 2022. Further, the deformation of the weakened part 2023 may occur with breakage or rupture, or the weakened part 2023 may be separated from the collar 202.

[Fourth Variation]

Figure 12:
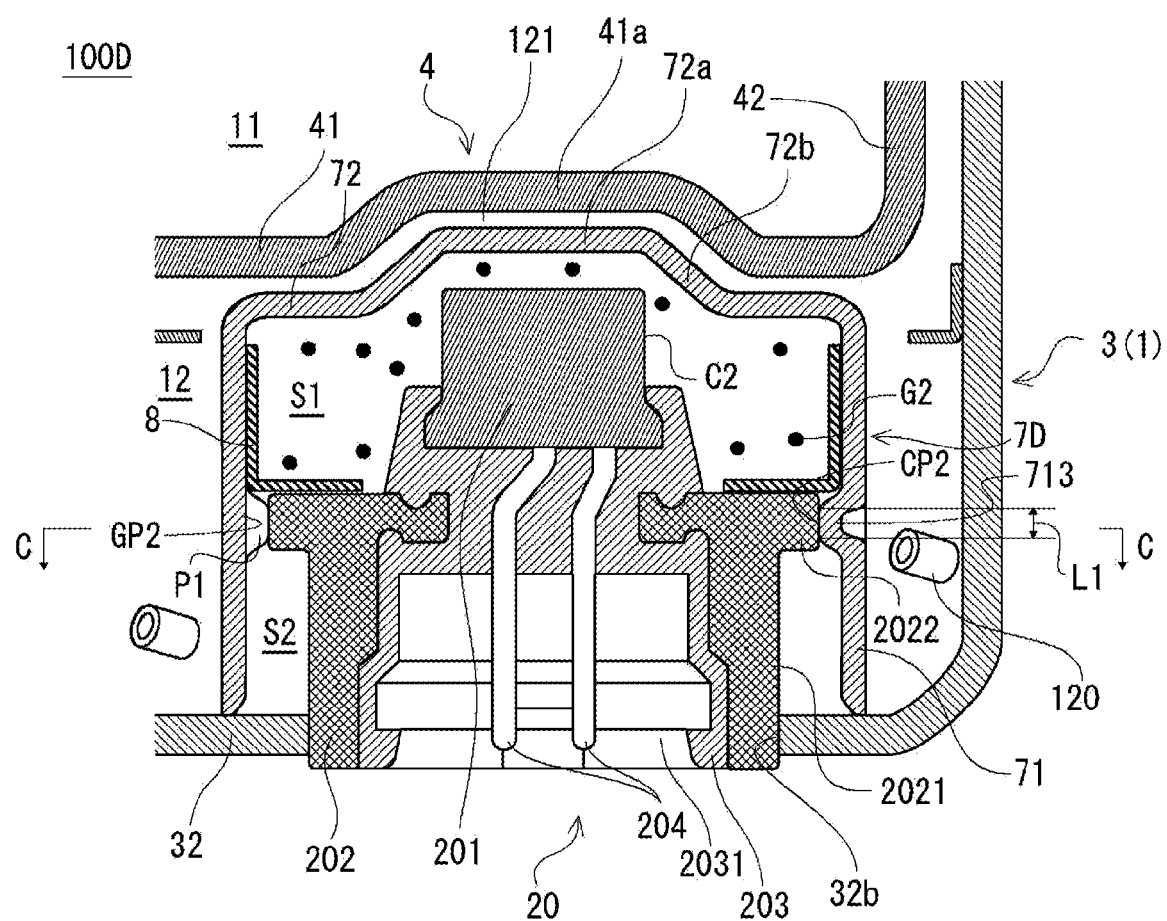
FIG. 12 is a diagram for explaining a structure in the vicinity of a second ignition device in a gas generator according to a fourth variation of the first embodiment.
Figure 13:
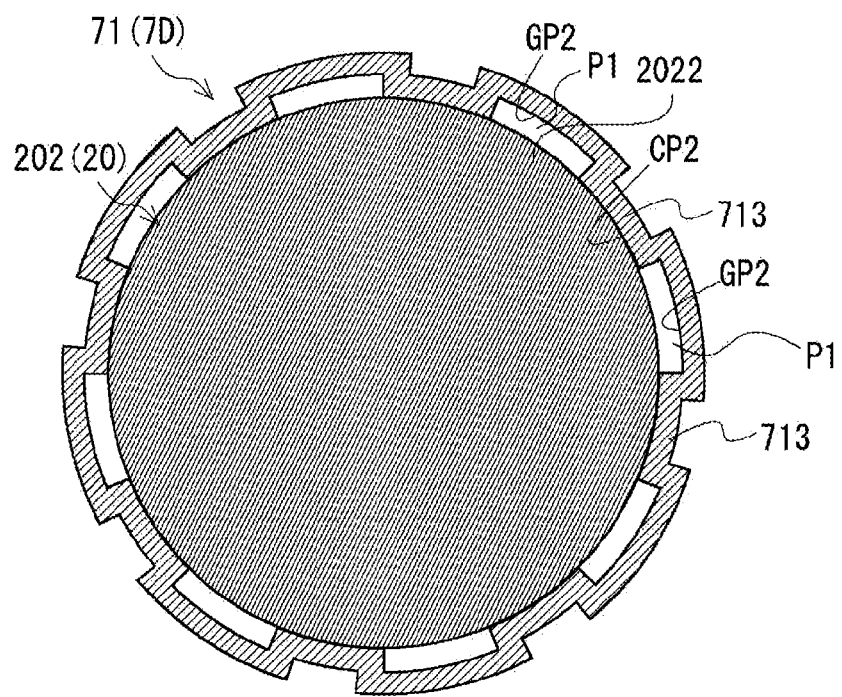
FIG. 13 is a cross-sectional view taken along line C-C of FIG. 12.

FIG. 12 is a diagram for explaining a structure in the vicinity of the second ignition device 20 in a gas generator 100D according to a fourth variation of the first embodiment. FIG. 12 illustrates a state before the second igniter 201 is actuated. Further, FIG. 13 is a cross-sectional view taken along line C-C of FIG. 12. As illustrated in FIG. 12, the gas generator 100D differs from the gas generator 100 in that the gas generator 100D has a configuration for determining the position of the inflow path P1 on the side of the second inner cylindrical member 7D, and the other configurations are substantially the same.

As illustrated in FIGS. 12 and 13, a plurality of inner protruding portions 713 protruding inward in the radial direction are formed at equal distances in the circumferential direction on the peripheral wall portion 71 of a second inner cylindrical member 7D according to the fourth variation. The peripheral wall portion 71 is press-fitted into the flange portion 2022 at the inner protruding portions 713. As a result, on an inner peripheral surface of a fitting portion of the peripheral wall portion 71 with the flange portion 2022, an inner cylinder-side contact portion CP2 that abuts on the flange portion 2022, and an inner cylinder-side gap forming portion GP2 that forms a gap between the inner cylinder-side gap forming portion GP2 and the flange portion 2022 by being located radially outside the inner cylinder-side contact portion CP2 are formed. As illustrated in FIG. 13, the inner cylinder-side contact portion CP2 is formed as an inner peripheral surface of the peripheral wall portion 71 in the inner protruding portion 713, and the inner cylinder-side gap forming portion GP2 is formed as an inner peripheral surface of the peripheral wall portion 71 in a region other than the inner protruding portion 713. Then, the inflow path P1 is formed by the gap between the flange portion 2022 and the inner cylinder-side gap forming portion GP2. Also, in the gas generator 100D, as with the gas generator 100, the outflow path P2 is formed by the second inner cylindrical member 7D moving upward along the axial direction by receiving the combustion pressure of the second transfer charge G2. At this time, when a length of the inner cylinder-side contact portion CP2 in the axial direction is L1, in the gas generator 100D, L1 is set so that the flange portion 2022 and the peripheral wall portion 71 do not come off from each other due to the movement of the second inner cylindrical member 7D.

[Fifth Variation]

Figure 14:
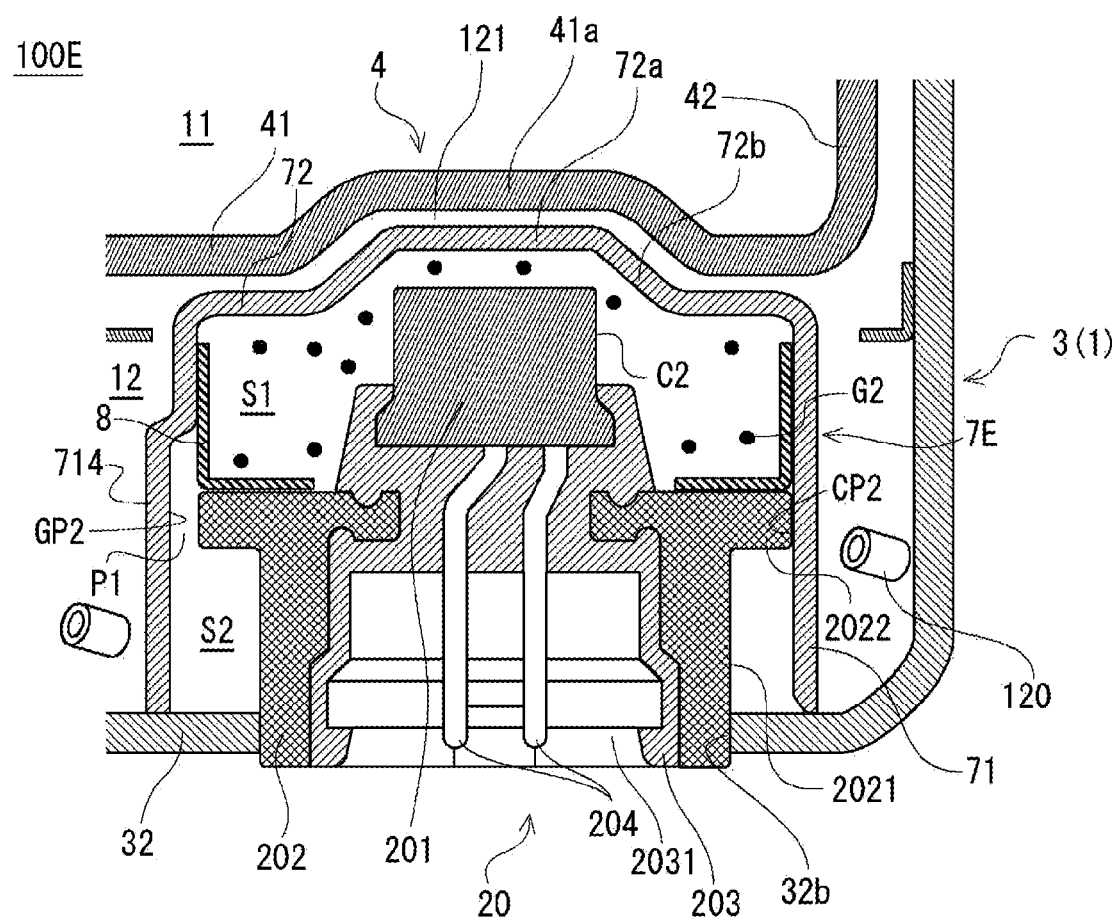
FIG. 14 is a diagram for explaining a structure in the vicinity of a second ignition device in a gas generator according to a fifth variation of the first embodiment.

FIG. 14 is a diagram for explaining a structure in the vicinity of the second ignition device 20 in a gas generator 100E according to a fifth variation of the first embodiment. FIG. 14 illustrates a state before the second igniter 201 is actuated. Similar to the gas generator 100D, the gas generator 100E differs from the gas generator 100 in that the gas generator 100E has a configuration for determining the position of the inflow path P1 on the side of the second inner cylindrical member 7E, and the other configurations are substantially the same.

As illustrated in FIG. 14, an outer protruding portion 714 protruding outward in the radial direction is formed on the peripheral wall portion 71 of a second inner cylindrical member 7E according to the fifth variation. The peripheral wall portion 71 is press-fitted into the flange portion 2022 in a region other than the outer protruding portion 714. With this configuration, on the inner peripheral surface of the fitting portion of the peripheral wall portion 71 with the flange portion 2022, the inner cylinder-side contact portion CP2 and the inner cylinder-side gap forming portion GP2 are formed. The inner cylinder-side contact portion CP2 is formed as an inner peripheral surface of the peripheral wall portion 71 in a region other than the outer protruding portion 714, and the inner cylinder-side gap forming portion GP2 is formed as an inner peripheral surface of the peripheral wall portion 71 in the outer protruding portion 714. Then, the inflow path P1 is formed by the gap between the flange portion 2022 and the inner cylinder-side gap forming portion GP2.

Second Embodiment

Figure 15:
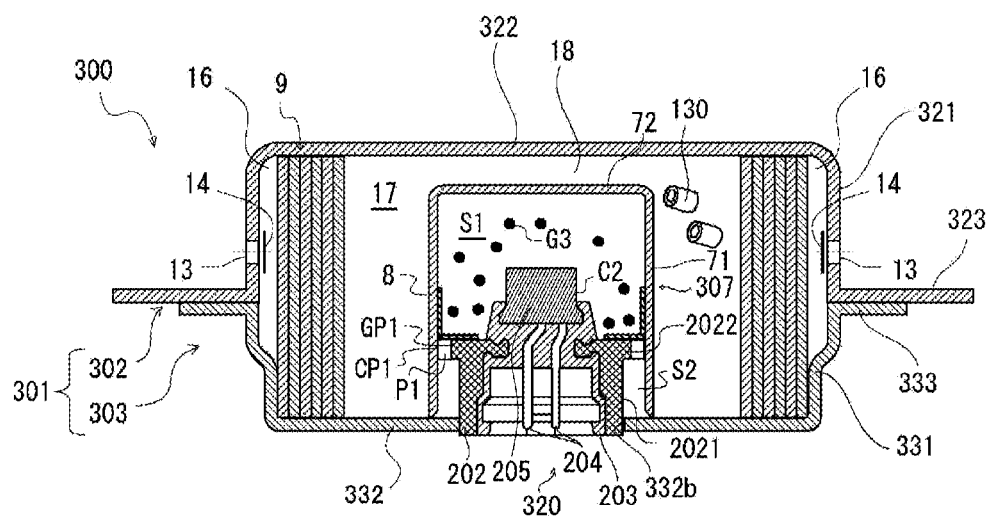
FIG. 15 is an axial cross-sectional view of a gas generator according to a second embodiment.

FIG. 15 is an axial cross-sectional view of a gas generator 300 according to a second embodiment. As illustrated in FIG. 15, the gas generator 300 is configured as a single stage gas generator in which one combustion chamber 17 and one ignition device 320 are accommodated inside a housing 301 formed by welding an upper shell 302 and a lower shell 303. Hereinafter, the gas generator 300 according to the second embodiment will be described focusing on a difference from the gas generator 100, and the similar configurations to those of the gas generator 100 will be designated by the same reference signs, and detailed description thereof will be omitted.

The upper shell 302 has a cylindrical upper peripheral wall portion 321 and a top plate portion 322 that closes an upper end of the upper peripheral wall portion 321, thereby forming an internal space. An opening portion of the upper shell 302 is formed by a lower end portion of the upper peripheral wall portion 321. A joining portion 323 extending radially outward is connected to the lower end portion of the upper peripheral wall portion 321. The lower shell 303 has a cylindrical lower peripheral wall portion 331 and a bottom plate portion 332 that closes a lower end of the lower peripheral wall portion 331, thereby forming an internal space. Further, a fitting hole 332b in which the ignition device 320 is fixed is formed in the bottom plate portion 332. A joining portion 333 extending radially outward is connected to the upper end portion of the lower peripheral wall portion 331. The joining portion 323 of the upper shell 302 and the joining portion 333 of the lower shell 303 are overlapped and joined by laser welding or the like to form a short cylindrical housing 301 in which both ends in the axial direction are closed. Further, the plurality of the gas discharge ports 13 closed by the seal tape 14 are formed side by side along the circumferential direction in the upper peripheral wall portion 321 of the upper shell 302.

The ignition device 320 has a configuration similar to the second ignition device 20 described in the first embodiment. The ignition device 320 is disposed at a substantially central position in the internal space of the housing 301 and is fixed in the fitting hole 332b of the lower shell 303. Further, an inner cylindrical member 307 that accommodates the ignition device 320 has a configuration similar to the second inner cylindrical member 7 described in the first embodiment. The transfer charge chamber S1 and the flow space S2 are formed between the ignition device 320 and the inner cylindrical member 307, and the flange portion 2022 of the ignition device 320 fits with the peripheral wall portion 71, thereby separating the transfer charge chamber S1 from the flow space S2. In the flange portion 2022 of the ignition device 320, the flange-side contact portion CP1 that abuts on the peripheral wall portion 71 and the flange-side gap forming portion GP1 that forms a gap between the flange-side gap forming portion GP1 and the peripheral wall portion 71, and the inflow path P1 is formed by the gap. In the transfer charge chamber S1, a transfer charge G3 that is burned by an igniter 205 is filled and the seal cup 8 that closes the inflow path P1 is disposed. An annular combustion chamber 17 is formed in the internal space of the housing 301 and surrounds the inner cylindrical member 307. In the combustion chamber 17, a gas generating agent 130 that is burned by the combustion gas of the transfer charge G3 is filled and the filter 9 is disposed in a manner of surrounding the gas generating agent 130. In addition, a gap 18 that is small enough so that the gas generating agent 130 does not enter is formed between the lid wall portion 72 of the inner cylindrical member 307 and the top plate portion 322 of the upper shell 302. Note that a retainer or cushion (not illustrated) may be disposed in the gap 18.

Figure 16:
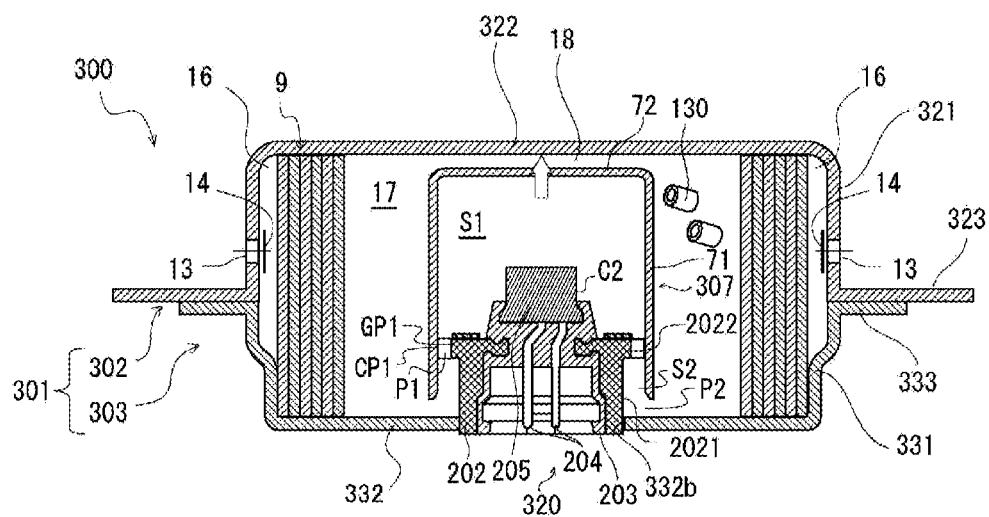
FIG. 16 is a diagram for explaining a state when a second igniter is actuated in the gas generator according to the second embodiment.

In the gas generator 300, when the igniter 205 of the ignition device 320 is activated, the transfer charge G3 filled in the transfer charge chamber S1 is burned. FIG. 16 is a diagram for explaining a state when the igniter 205 is actuated and the transfer charge G3 is burned in the second embodiment. When the internal pressure of the transfer charge chamber S1 reaches a predetermined value or more, the seal cup 8 is ruptured, and the combustion gas of the transfer charge G3 can flow from the transfer charge chamber S1 into the flow space S2 through the inflow path P1. On the other hand, the inner cylindrical member 307 that receives the combustion pressure of the transfer charge G3 moves upward along the axial direction while maintaining the fitting with the flange portion 2022, and the lower end portion of the peripheral wall portion 71 is separated from the bottom plate portion 332, whereby an annular gap is formed between the lower end portion of the peripheral wall portion 71 and the bottom plate portion 332 of the housing 301. This gap forms the outflow path P2. As a result, the combustion gas of the transfer charge G3 generated in the transfer charge chamber S1 flows into the flow space S2 through the inflow path P1, temporarily stays in the flow space S2, and then flows out to the outside of the inner cylindrical member 307 (that is, the combustion chamber 17) through the outflow path P2. The combustion gas of the transfer charge G3 flowing out from the outflow path P2 burns the gas generating agent 130 disposed in the combustion chamber 17, and high-temperature and high-pressure combustion gas is generated in the combustion chamber 17. Here, also in the gas generator 300, the total cross-sectional area of the inflow path P1 is configured to be smaller than the cross-sectional area of the flow space S2. With this configuration, the combustion gas is decelerated in the flow space S2, and the combustion gas of the transfer charge G3 flowing out from the outflow path P2 is decelerated. Therefore, it is suppressed that the gas generating agent 130 is damaged due to the impact of the combustion gas. After being cooled and filtered by the filter 9, the combustion gas of the gas generating agent 130 passes through the gap 16 and ruptures the seal tape 14 to be discharged from the gas discharge ports 13 to the outside of the housing 301.

Also, in the gas generator 300 according to the second embodiment, the combustion gas is not directly discharged from the transfer charge chamber S1 to the outside of the inner cylindrical member 307, but is passed through the flow space S2 so that the flow rate of the combustion gas can be decelerated in the flow space S2, and thus the combustion gas flowing out of the second inner cylindrical member 7 can be decelerated. As a result, damage to the gas generating agent 130 due to the impact of the combustion gas can be suppressed, and it is possible to stably obtain the desired discharge characteristics.

OTHER EXAMPLES

Suitable embodiments of the present disclosure have been described above, but each embodiment disclosed in the present specification can be combined with each of the features disclosed in the present specification. Further, in the examples described with reference to FIGS. 1 to 16, the examples are illustrated in which the bottom plate portion 32 or 332 and the collar 202, which are separate components, are fixed by welding or the like, but it is also possible to use a component in which a bottom plate portion and a collar are integrally formed in advance.

REFERENCE SIGNS LIST

1 Housing
7 Second inner cylindrical member (example of inner cylindrical member)
71 Peripheral wall portion
72 Lid wall portion
20 Second ignition device (example of ignition device)
201 Second igniter (example of igniter)
202 Collar (example of igniter support)
2022 Flange portion
120 Second gas generating agent (example of gas generating agent)
100 Gas generator
S1 Transfer charge chamber
S2 Flow space
P1 Inflow path

The invention claimed is:
1. A gas generator, comprising:
a housing;
an ignition device having a flange portion and including an igniter and an igniter support formed in the housing and supporting the igniter;
an inner cylindrical member having a peripheral wall portion and a lid wall portion configured to close one end portion of the peripheral wall portion, and accommodating the ignition device inside, and configured to form a transfer charge chamber which is filled with a transfer charge that is to be burned by actuation of the igniter, the transfer charge chamber being provided between the inner cylindrical member and the ignition device; and
a gas generating agent disposed outside the inner cylindrical member and configured to be burned by combustion gas of the transfer charge, wherein
between the ignition device and the inner cylindrical member,
on a side of the lid wall portion, the transfer charge chamber is formed, and on a side of another end portion of the peripheral wall portion, a flow space is formed, the flow space being a space configured to allow the combustion gas to flow in from the transfer charge chamber when the igniter is actuated, and being a space configured to allow the combustion gas to flow out to the outside of the inner cylindrical member when the igniter is actuated, and
a gap formed between the flange portion and the peripheral wall portion is closed by a closing member before activation of the ignition device.
2. The gas generator according to claim 1, wherein
a total cross-sectional area of an outflow path serving as a flow path through which the combustion gas flows out from the flow space to the outside of the inner cylin- drical member, is configured to be equal to or smaller than the cross-sectional area of the flow space.

3. The gas generator according to claim 2, wherein the total cross-sectional area of the outflow path is configured to be larger than a total cross-sectional area of an inflow path.

4. The gas generator according to claim 1, wherein the flange portion protrudes toward the peripheral wall portion and is configured to separate the transfer charge chamber from the flow space, and
an inflow path is formed by the gap.

5. The gas generator according to claim 4, wherein
on an outer peripheral surface of the flange portion, a flange-side contact portion and a flange-side gap forming portion are formed, the flange-side contact portion being in contact with the peripheral wall portion, and the flange-side gap forming portion being located radially inside the flange-side contact portion and forming the gap between the flange-side gap forming portion and the peripheral wall portion.

6. The gas generator according to claim 4, wherein
on an inner peripheral surface of the peripheral wall portion, at a fitting portion with the flange portion, an inner cylinder-side contact portion and an inner cylinder-side gap forming portion are formed, the inner cylinder-side contact portion being in contact with the flange portion, and the inner cylinder-side gap forming portion being located radially outside the inner cylinder-side contact portion and forming the gap between the inner cylinder-side gap forming portion and the flange portion.

7. The gas generator according to claim 1, wherein
the flange portion protrudes toward the peripheral wall portion and is fitted with the peripheral wall portion and is configured to separate the transfer charge chamber from the flow space, and
a weakened part is formed in the flange portion, the weakened part being configured to receive pressure of the combustion gas and to be deformed, and allowing an inflow path to open.

8. The gas generator according to claim 1, wherein
the flange portion protrudes toward the peripheral wall portion and is fitted with the peripheral wall portion and is configured to separate the transfer charge chamber from the flow space, and
an inflow path is formed as a through hole passing through the flange portion.

9. The gas generator according to claim 2, wherein
the inner cylindrical member is disposed in a state that the another end portion of the peripheral wall portion abuts on the housing, and
the outflow path is formed between the another end portion of the peripheral wall portion and the housing when the inner cylindrical member receives pressure of the combustion gas, and the another end portion of the peripheral wall portion moves away and separates from the housing.

10. The gas generator according to claim 2, wherein
the inner cylindrical member is disposed in a state that the another end portion of the peripheral wall portion abuts on the housing, and
at the another end portion of the peripheral wall portion, a contact end portion abutting on the housing and a recessed end portion recessed in an axial direction from the contact end portion are formed, and
the outflow path is formed between the recessed end portion and the housing.

11. The gas generator according to claim 2, wherein
the flange portion protrudes toward the peripheral wall portion and is fitted with the peripheral wall portion and is configured to separate the transfer charge chamber from the flow space, and
an inflow path is formed by the gap.

12. The gas generator according to claim 3, wherein
the flange portion protrudes toward the peripheral wall portion and is fitted with the peripheral wall portion and is configured to separate the transfer charge chamber from the flow space, and
the inflow path is formed by the gap.

13. The gas generator according to claim 3, wherein
the inner cylindrical member is disposed in a state that the another end portion of the peripheral wall portion abuts on the housing, and
the outflow path is formed between the another end portion of the peripheral wall portion and the housing when the inner cylindrical member receives pressure of the combustion gas, and the another end portion of the peripheral wall portion moves away and separates from the housing.

14. The gas generator according to claim 3, wherein
the inner cylindrical member is disposed in a state that the another end portion of the peripheral wall portion abuts on the housing, and
at the another end portion of the peripheral wall portion, a contact end portion abutting on the housing and a recessed end portion recessed in an axial direction from the contact end portion are formed, and
the outflow path is formed between the recessed end portion and the housing.

15. The gas generator according to claim 1, wherein
the closing member is a seal cup provided within the transfer charge chamber such that the bottom surface portion thereof covering the gap and a cylindrical wall portion thereof extending from a peripheral edge of the bottom surface portion is abutted on the peripheral wall portion of the inner cylindrical member.

16. The gas generator according to claim 4, wherein
a plurality of inner protruding portions protruding inward in a radial direction are formed in a circumferential direction on the peripheral wall portion of the inner cylindrical member, and the peripheral wall portion is press-fitted into the flange portion at the inner protruding portions.

17. The gas generator according to claim 1, wherein
the lid wall portion includes a protruding surface facing the igniter and an inclined surface surrounding the protruding surface.

18. The gas generator according to claim 9, wherein
a total cross-sectional area of an inflow path maintains a constant cross-section across the length of the inflow path while the another end portion of the peripheral wall portion moves away and separates from the housing.

19. The gas generator according to claim 1, wherein
a total cross-sectional area of an inflow path serving as a flow path through which the combustion gas flows from the transfer charge chamber into the flow space is configured to be smaller than a cross-sectional area of the flow space.

20. A gas generator, comprising:
a housing;
an ignition device including an igniter and an igniter support formed in the housing and supporting the igniter;

an inner cylindrical member having a peripheral wall portion and a lid wall portion configured to close one end portion of the peripheral wall portion, and accommodating the ignition device inside, and configured to form a transfer charge chamber which is filled with a transfer charge that is to be burned by actuation of the igniter, the transfer charge chamber being provided between the inner cylindrical member and the ignition device; and a gas generating agent disposed outside the inner cylindrical member and configured to be burned by combustion gas of the transfer charge, wherein between the ignition device and the inner cylindrical member, on a side of the lid wall portion, the transfer charge chamber is formed, and on a side of another end portion of the peripheral wall portion, a flow space is formed, the flow space being a space configured to allow the combustion gas to flow in from the transfer charge chamber when the igniter is actuated, and being a space configured to allow the combustion gas to flow out to the outside of the inner cylindrical member when the igniter is actuated a total cross-sectional area of an inflow path serving as a flow path through which the combustion gas flows from the transfer charge chamber into the flow space is configured to be smaller than a cross-sectional area of the flow space, the ignition device has a flange portion, the flange portion protruding toward the peripheral wall portion and fitted with the peripheral wall portion and being configured to separate the transfer charge chamber from the flow space, and a weakened part is formed in the flange portion, the weakened part being configured to receive pressure of the combustion gas and to be deformed, and allowing the inflow path to open.

* * * * *